(12) United States Patent
Mathew et al.

(10) Patent No.: US 6,493,750 B1
(45) Date of Patent: Dec. 10, 2002

(54) COMMAND FORWARDING: A METHOD FOR OPTIMIZING I/O LATENCY AND THROUGHPUT IN FIBRE CHANNEL CLIENT/SERVER/TARGET MASS STORAGE ARCHITECTURES

(75) Inventors: Brandon H Mathew, Auburn; Eric G Tausheck, Citrus Heights; Matthew P Wakeley, Roseville, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/183,969

(22) Filed: Oct. 30, 1998

(51) Int. Cl.[7] ............................................... G06F 13/00
(52) U.S. Cl. .................... 709/220; 709/106; 709/200
(58) Field of Search ................................. 709/100, 101, 709/102, 103, 104, 200, 201, 220, 226, 228, 229, 250, 204, 205, 206; 710/11, 14, 38, 131, 56; 717/100, 149

(56) References Cited

U.S. PATENT DOCUMENTS

| | | | | |
|---|---|---|---|---|
| 5,043,938 A | * | 8/1991 | Ebersole | 709/250 |
| 5,175,732 A | * | 12/1992 | Hendel et al. | 370/463 |
| 5,313,582 A | * | 5/1994 | Hendel et al. | 710/56 |
| 5,978,578 A | * | 11/1999 | Azarya et al. | 717/100 |
| 6,067,585 A | * | 5/2000 | Hoang | 710/11 |
| 6,275,852 B1 | * | 8/2001 | Filepp et al. | 709/200 |

* cited by examiner

Primary Examiner—Majid Banankhanh

(57) ABSTRACT

An interface controller for a communications network port that includes support for an efficient client/server protocol for exchanging data between client computers and target mass storage devices. The interface controller includes support to allow a server computer to forward a read or write command from a client computer to a target mass storage device containing the identification of a client computer as the source of the read or write command. Interface controller support also allows a clients computer to receive response to messages elicited by a read and write command transmitted to a server computer directly from a target mass storage device by copying the identification of the mass storage target device into a data structure within the interface controller to which subsequent identifications within subsequent data and status messages received from the target mass storage device are compared. The client/server protocol eliminates redundant data transfers and eliminates storing and forwarding of data by a server computer.

11 Claims, 32 Drawing Sheets

| INITIATOR | | TARGET | |
|---|---|---|---|
| STATE | EVENTS | EVENTS | STATE |
| BUS FREE 614 | | | BUS FREE |
| ARBITRATION 616 | ASSERT BSY AND D7 ASSERT SEL | | ARBITRATION |
| SELECTION 618 | ASSERT DX AND ATN | | SELECTION |
| SELECTION 620 | DROP BSY DROP SEL | ASSERT BSY | SELECTION |
| MESSAGE OUT 622 | 625 IDENTIFY DISCONNECT LUN 623 PRIVILEDGE 624 | | MESSAGE OUT |
| MESSAGE OUT | QUEUE TAG MESSAGE SIMPLE QUEUE TAG 626 QUEUE TAG 627 | | MESSAGE OUT |
| COMMAND 628 | READ OR WRITE 632 630 OPCODE (READ OR WRITE) FLAGS LOGICAL BLOCK NO. 636 DATA LENGTH 638 | | COMMAND |
| MESSAGE IN 640 | DISCONNECT 642 | | MESSAGE IN |
| BUS FREE 644 | | DROP BSY | BUS FREE |

| INITIATOR | | | | TARGET |
|---|---|---|---|---|
| STATE | | | | STATE |
| BUS FREE 646 | | | | BUS FREE |
| ARBITRATION 648 | | ASSERT BSY AND DX ASSERT SEL AND I/O | | ARBITRATION |
| RESELECTION 650 | | ASSERT DX AND ATN DROP SEL | | RESELECTION |
| MESSAGE IN 652 | | IDENTIFY<br>┌─────┬──────┐<br>│     │ LUN  │ 654<br>└─────┴──────┘<br>← | | MESSAGE IN |
| MESSAGE IN | | QUEUE TAG MESSAGE<br>┌──────────┬──────────┐<br>│ SIMPLE   │ QUEUE TAG│ 656<br>│ QUEUE TAG│          │<br>└──────────┴──────────┘<br>← | | MESSAGE IN |
| DATA IN (READ) OUT (WRITE) 658 | ACK | DATA | REQ | DATA IN (READ) OUT (WRITE) |
| | | → WRITE<br>READ ← | | |
| OPTIONAL DISCONNECT/ RECONNECT 660 | MESSAGE IN | SAVE POINTERS ← | MESSAGE IN | OPTIONAL DISSCONNECT/ RECONNECT |
| | MESSAGE IN | DISCONNECT ← | MESSAGE IN | |
| | BUS FREE | | BUS FREE | |
| | ARBITRATION | | ARBITRATION | |
| | RESELECTION | | RESELECTION | |
| | MESSAGE IN | IDENTIFY ← | MESSAGE IN | |
| | MESSAGE IN | QUEUE TAG MESSAGE ← | MESSAGE IN | |
| DATA | ACK | DATA | REQ | DATA |
| | | → WRITE<br>READ ← | | |
| MESSAGE IN 662 | | DISCONNECT ← | | MESSAGE IN |
| BUS FREE 664 | | DROP BSY | | BUS FREE |

FIG.6B

| INITIATOR | | | TARGET |
|---|---|---|---|
| STATE | | | STATE |
| BUS FREE 666 | | | BUS FREE |
| ARBITRATION 668 | | ASSERT BSY AND DX ASSERT SEL AND I/O | ARBITRATION |
| RESELECTION 670 | | ASSERT DX AND ATN DROP SEL | RESELECTION |
| MESSAGE IN 672 | | IDENTIFY [ LUN ] ←─ 674 | MESSAGE IN |
| MESSAGE IN | | QUEUE TAG MESSAGE [ SIMPLE QUEUE TAG \| QUEUE TAG ] ←─ 676 | MESSAGE IN |
| STATUS 678 | | [ 00h ] ←─ 680 | STATUS |
| MESSAGE IN 682 | | COMMAND COMPLETE [ 00h ] ←─ 684 | MESSAGE IN |
| BUS FREE 686 | | DROP BSY | BUS FREE |

FIG. 6C

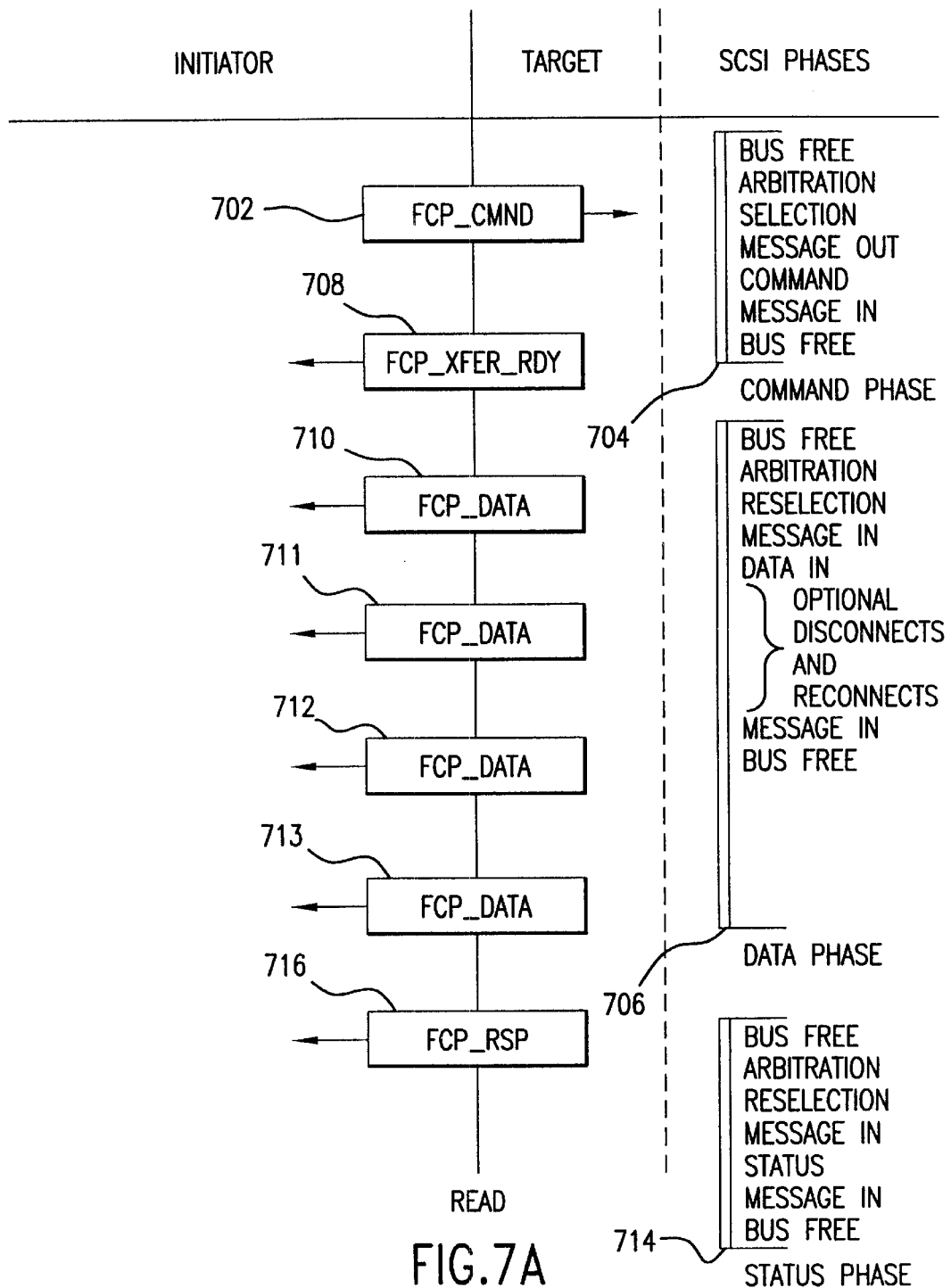

COMMAND FORWARDING: A METHOD FOR OPTIMIZING I/O LATENCY AND THROUGHPUT IN FIBRE CHANNEL CLIENT/SERVER/TARGET MASS STORAGE ARCHITECTURES

TECHNICAL FIELD

The present invention relates to the implementation of client/server data transfer protocols, and, in particular, to a method and system that allows a server computer to accept data transfer requests from a client computer, authorize those requests and map them to target devices, and then direct the target devices to directly respond to the client computer, thereby eliminating unnecessary data traffic in a communications network.

BACKGROUND OF THE INVENTION

The fibre channel ("FC") is an architecture and protocol for a data communication network for interconnecting a number of different combinations of computers and peripheral devices. The FC supports a variety of upper-level protocols, including the small computer systems interface ("SCSI") protocol. A computer or peripheral device is linked to the network through an FC port and copper wires or optical fibres. An FC port includes a transceiver and an interface controller, and the computer peripheral device in which the FC port is contained is called a "host." The FC port exchanges data with the host via a local data bus, such as a peripheral computer interface ("PCI") bus. The interface controller conducts lower-level protocol exchanges between the fibre channel and the computer or peripheral device in which the FC port resides.

A popular paradigm for accessing remote data in computer networks is the client/server architecture. According to this architecture, a client computer sends a request to read or write data to a server computer. The server computer processes the request by checking that the client server has authorization and permission to read or write the data, by mapping the requested read or write operation to a particular mass storage device, and by serving as an intermediary in the transfer of data from the client computer to the mass storage device, in case of a write operation, or from the mass storage device to the client, in case of a read operation.

In common, currently-available and previously-available communication network architectures, the server computer communicates with the client computer through a local area network ("LAN") and the server computer communicates with a number of mass storage devices over a local bus, such as a SCSI bus. In such systems, the server is required to store and forward the data transferred as a result of the read or write operation because the server represents a bridge between two dissimilar communications media.

With the advent of the FC, client computers, server computers, and mass storage devices may all be symmetrically interconnected by a single communications medium. The traditional client/server architecture is commonly ported to the FC using the same type of client/server protocols as are used in the LAN and SCSI networks discussed above. Implementing a client/server architecture using these client/server protocols introduces significant inefficiencies in data transfer with concomitant increases in I/O latency and loss of fibre channel throughput. Designers and manufacturers of fibre channel ports that are used to interconnect mass storage devices, client computers and server computers, have recognized the need for designing new client/server protocols that are better suited to take advantage of the FC.

SUMMARY OF THE INVENTION

The present invention provides a fibre channel ("FC") interface controller that supports, in hardware, efficient client/server data transfer protocols, and provides a method for implementing the efficient data transfer protocols. The interface controller of the present invention supports the forwarding of a read or write command from a server computer to a mass storage device such that the identification contained in the forwarded data transfer command is that of the client computer, rather than the server computer that forwards the data transfer command. The interface controller also supports copying of the source identification contained in data and status messages sent by a mass storage device to a client computer in response to the data transfer command automatically into the data structure that is used by the interface controller to check correspondence between the destination identification associated with a data transfer command issued by the client computer and the source identification of data messages and status messages received back by the client computer in response to the data transfer command. These two features of the interface controller enable the data transfer protocol of the present invention. In the data transfer protocol, a server computer, in response to receiving a read command from a client computer, forwards the read command to a target mass storage device, which, in turn, transmits the data requested by the read command and a final status message directly back to the requesting client computer. In response to a write command received by a server computer from a client computer, the server computer forwards the write command to a target mass storage device. The target mass storage device sends a transfer ready status message directly to the client computer, receives, directly from the client computer, the data to be written to the mass storage device, and finally sends a status message directly back to the client computer. This improved data transfer protocol eliminates unnecessary storing and forwarding of data by the server computer and eliminates the transfer of redundant data messages and status messages within the communications network.

BRIEF DESCRIPTION OF THE DRAWINGS

FIGS. 6A–6C illustrate the SCSI protocol involved in the initiation and implementation of read and write I/O operations.

FIGS. 7A–7B illustrate a mapping of the FC Protocol to SCSI sequences exchanged between an initiator and target and the SCSI bus phases and states described in FIGS. 6A–6C.

DETAILED DESCRIPTION OF THE INVENTION

Figure 1A:
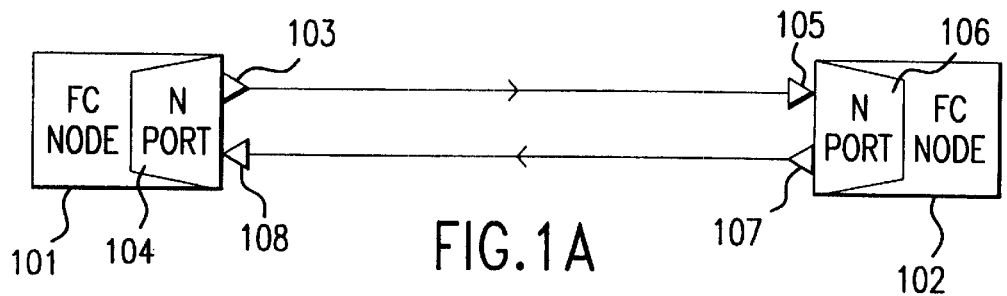
FIGS. 1A–1C shows the three different types of FC interconnection topologies.

The present invention will be described below in six subsections. The first three subsections provide greater detail about the fibre channel architecture and protocol, the SCSI architecture and protocol, and implementation of the SCSI protocol on top of the fibre channel protocol. The fourth subsection discusses the fibre channel arbitrated loop intialization process. The fifth subsection provides a general description of the present invention, and the sixth subsection provides a detailed description of an implementation of the present invention.

Fibre Channel

The Fibre Channel ("FC") is defined by, and described in, a number of ANSI Standards documents, including: (1) Fibre Channel Physical and Signaling Interface ("FC-PH"), ANSI X3.230-1994, ("FC-PH-2), ANSI X3.297-1997; (2) Fibre Channel—Arbitrated Loop ("FC-AL-2"), ANSI X3.272-1996; (3) Fibre Channel—Private Loop SCSI Direct Attached ("FC-PLDA"); (4) Fibre Channel—Fabric Loop Attachment ("FC-FLA"); (5) Fibre Channel Protocol for SCSI ("FCP"); (6) Fibre Channel Fabric Requirements ("FC-FG"), ANSI X3.289:1996; and (7) Fibre Channel 10-Bit Interface. These standards documents are under frequent revision. Additional Fibre Channel System Initiative ("FCSI") standards documents include: (1) Gigabaud Link Module Family ("GLM"), FCSI-301; (2) Common FC-PH Feature Sets Profiles, FCSI-101; and (3) SCSI Profile, FCSI-201. These documents may be found at the world wide web Internet page having the following address:

"http://www.fibrechannel.com"

The following description of the FC is meant to introduce and summarize certain of the information contained in these documents in order to facilitate discussion of the present invention. If a more detailed discussion of any of the topics introduced in the following description is desired, the above-mentioned documents may be consulted.

The FC is an architecture and protocol for data communications between FC nodes, generally computers, workstations, peripheral devices, and arrays or collections of peripheral devices, such as disk arrays, interconnected by one or more communications media. Communications media include shielded twisted pair connections, coaxial cable, and optical fibers. An FC node is connected to a communications medium via at least one FC port and FC link. An FC port is an FC host adapter or FC controller that shares a register and memory interface with the processing components of the FC node, and that implements, in hardware and firmware, the lower levels of the FC protocol. The FC node generally exchanges data and control information with the FC port using shared data structures in shared memory and using control registers in the FC port. The FC port includes serial transmitter and receiver components coupled to a communications medium via a link that comprises electrical wires or optical strands.

In the following discussion, "FC" is used as an adjective to refer to the general Fibre Channel architecture and protocol, and is used as a noun to refer to an instance of a Fibre Channel communications medium. Thus, an FC (architecture and protocol) port may receive an FC (architecture and protocol) sequence from the FC (communications medium).

Figure 1B:
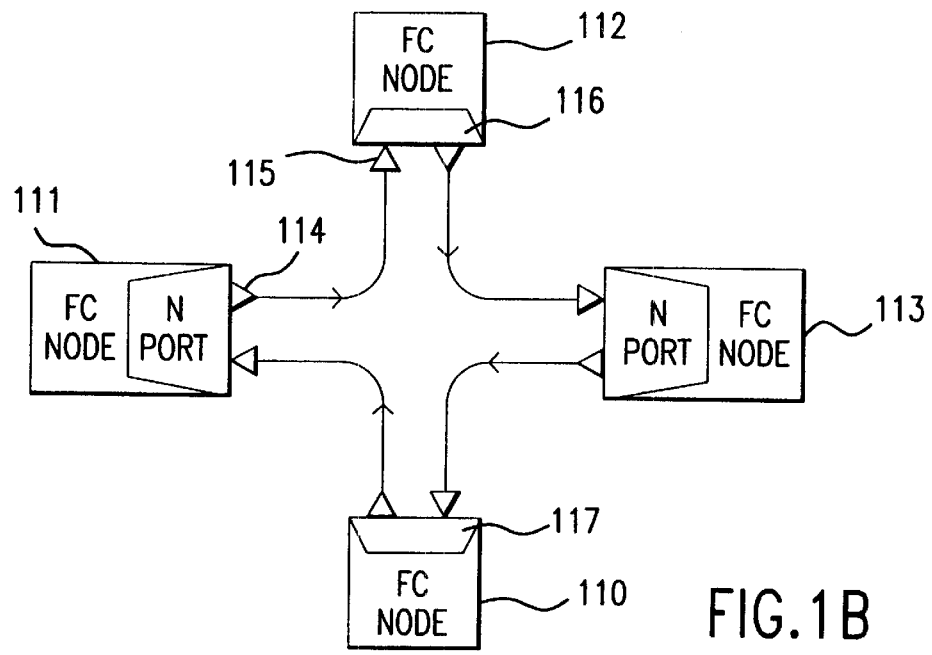
Figure 1C:
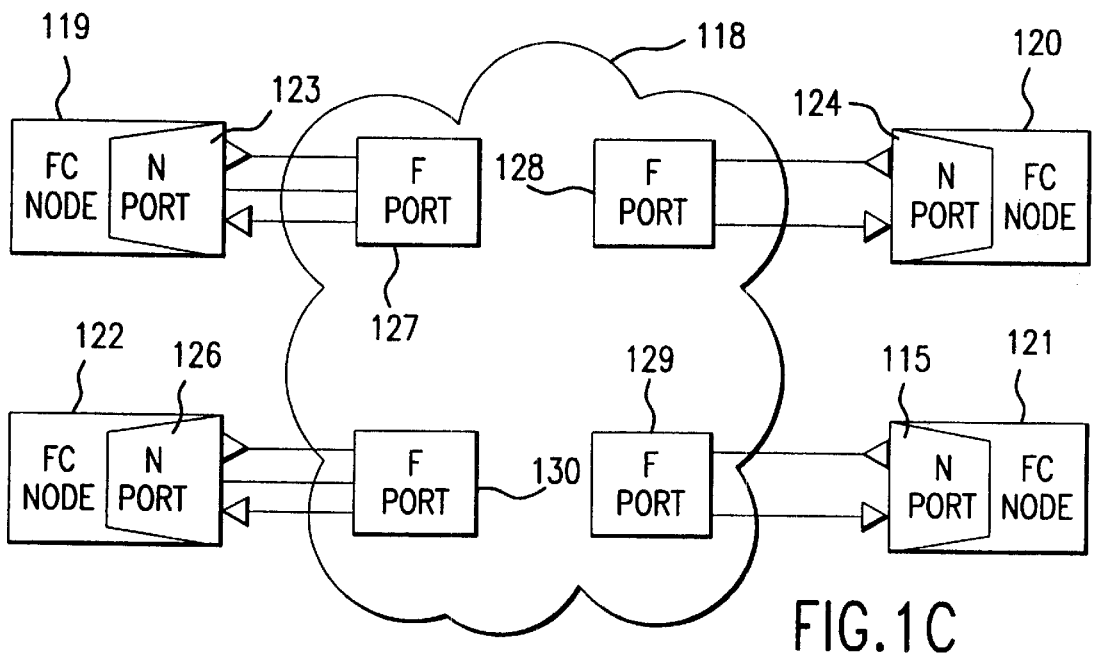

The FC architecture and protocol support three different types of interconnection topologies, shown in FIGS. 1A–1C. FIG. 1A shows the simplest of the three interconnected topologies, called the "point-to-point topology." In the point-to-point topology shown in FIG. 1A, a first node 101 is directly connected to a second node 102 by directly coupling the transmitter 103 of the FC port 104 of the first node 101 to the receiver 105 of the FC port 106 of the second node 102, and by directly connecting the transmitter 107 of the FC port 106 of the second node 102 to the receiver 108 of the FC port 104 of the first node 101. The ports 104 and 106 used in the point-to-point topology are called N_Ports.

FIG. 1B shows a somewhat more complex topology called the "FC arbitrated loop topology." FIG. 1B shows four nodes 110–113 interconnected within an arbitrated loop. Signals, consisting of electrical or optical binary data, are transferred from one node to the next node around the loop in a circular fashion. The transmitter of one node, such as transmitter 114 associated with node 111, is directly connected to the receiver of the next node in the loop, in the case of transmitter 114, with the receiver 115 associated with node 112. Two types of FC ports may be used to interconnect FC nodes within an arbitrated loop. The most common type of port used in arbitrated loops is called the "NL_Port." A special type of port, called the "FL_Port," may be used to interconnect an FC arbitrated loop with an FC fabric topology, to be described below. Only one FL_Port may be actively incorporated into an arbitrated loop topology. An FC arbitrated loop topology may include up to 127 active FC ports, and may include additional nonparticipating FC ports.

In the FC arbitrated loop topology, nodes contend for, or arbitrate for, control of the arbitrated loop. In general, the node with the lowest port address obtains control in the case that more than one node is contending for control. A fairness algorithm may be implemented by nodes to ensure that all nodes eventually receive control within a reasonable amount of time. When a node has acquired control of the loop, the node can open a channel to any other node within the arbitrated loop. In a half duplex channel, one node transmits and the other node receives data. In a full duplex channel, data may be transmitted by a first node and received by a second node at the same time that data is transmitted by the second node and received by the first node. For example, if, in the arbitrated loop of FIG. 1B, node 111 opens a full duplex channel with node 113, then data transmitted through that channel from node 111 to node 113 passes through NL_Port 116 of node 112, and data transmitted by node 113 to node 111 passes through NL_Port 117 of node 110.

FIG. 1C shows the most general and most complex FC topology, called an "FC fabric." The FC fabric is represented in FIG. 1C by the irregularly shaped central object 118 to which four FC nodes 119–122 are connected. The N_Ports 123–126 within the FC nodes 119–122 are connected to F_Ports 127–130 within the fabric 118. The fabric is a switched or cross-point switch topology similar in function to a telephone system. Data is routed by the fabric between F_Ports through switches or exchanges called "fabric elements." There may be many possible routes through the fabric between one F_Port and another F_Port. The routing of data and the addressing of nodes within the fabric associated with F_Ports are handled by the FC fabric, rather than by FC nodes or N_Ports.

When optical fibers are employed, a single FC fabric can extend for ten kilometers. The FC can support interconnection of more than 16,000,000 FC nodes. A single FC host adapter can transmit and receive data at rates of up to 200 Mbytes per second. Much higher data exchange rates are planned for FC components in the near future.

Figure 2:
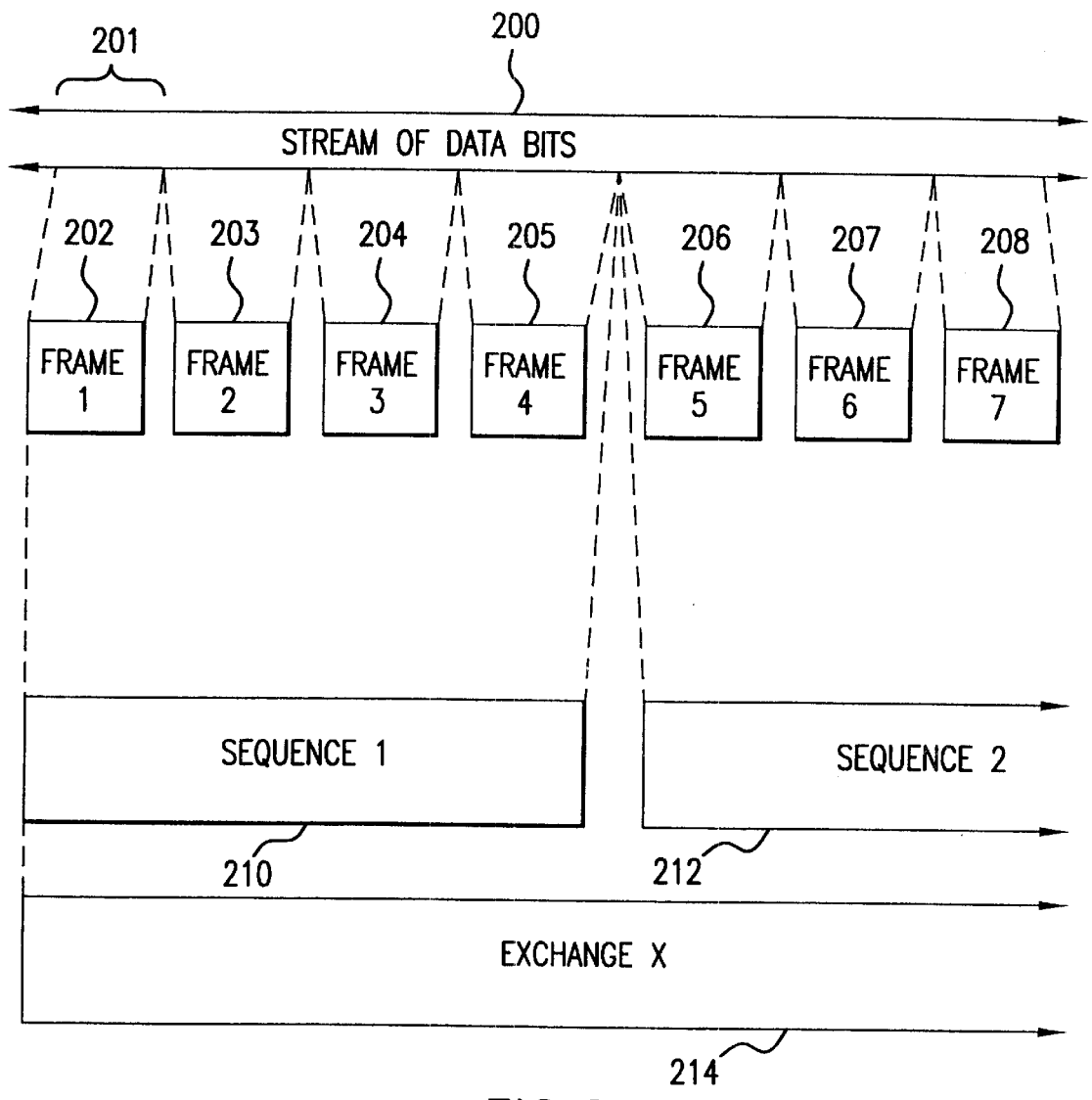
FIG. 2 illustrates a very simple hierarchy by which data is organized, in time, for transfer through an FC network.

The FC is a serial communications medium. Data is transferred one bit at a time at extremely high transfer rates. FIG. 2 illustrates a very simple hierarchy by which data is organized, in time, for transfer through an FC network. At the lowest conceptual level, the data can be considered to be a stream of data bits 200. The smallest unit of data, or grouping of data bits, supported by an FC network is a 10-bit character that is decoded by FC port as an 8-bit character. FC primitives are composed of 10-byte characters or bytes. Certain FC primitives are employed to carry control information exchanged between FC ports. The next level of data organization, a fundamental level with regard to the FC protocol, is a frame. Seven frames 202–208 are shown in FIG. 2. A frame may be composed of between 36 and 2,148 bytes of data, depending on the nature of the data included in the frame. The first FC frame, for example, corresponds to the data bits of the stream of data bits 200 encompassed by the horizontal bracket 201. The FC protocol specifies a next higher organizational level called the sequence. A first sequence 210 and a portion of a second sequence 212 are displayed in FIG. 2. The first sequence 210 is composed of frames one through four 202–205. The second sequence 212 is composed of frames five through seven 206–208 and additional frames that are not shown. The FC protocol specifies a third organizational level called the exchange. A portion of an exchange 214 is shown in FIG. 2. This exchange 214 is composed of at least the first sequence 210 and the second sequence 212 shown in FIG. 2. This exchange can alternatively be viewed as being composed of frames one through seven 202–208, and any additional frames contained in the second sequence 212 and in any additional sequences that compose the exchange 214.

The FC is a full duplex data transmission medium. Frames and sequences can be simultaneously passed in both directions between an originator, or initiator, and a responder, or target. An exchange comprises all sequences, and frames within the sequences, exchanged between an originator and a responder during a single I/O transaction, such as a read I/O transaction or a write I/O transaction. The FC protocol is designed to transfer data according to any number of higher-level data exchange protocols, including the Internet protocol ("IP"), the Small Computer Systems Interface ("SCSI") protocol, the High Performance Parallel Interface ("HIPPI"), and the Intelligent Peripheral Interface ("IPI"). The SCSI bus architecture will be discussed in the following subsection, and much of the subsequent discussion in this and remaining subsections will focus on the SCSI protocol embedded within the FC protocol. The standard adaptation of SCSI protocol to fibre channel is subsequently referred to in this document as "FCP.". Thus, the FC can support a master-slave type communications paradigm that is characteristic of the SCSI bus and other peripheral interconnection buses, as well as the relatively open and unstructured communication protocols such as those used to implement the Internet. The SCSI bus architecture concepts of an initiator and target are carried forward in the FCP, designed, as noted above, to encapsulate SCSI commands and data exchanges for transport through the FC.

Figure 3:
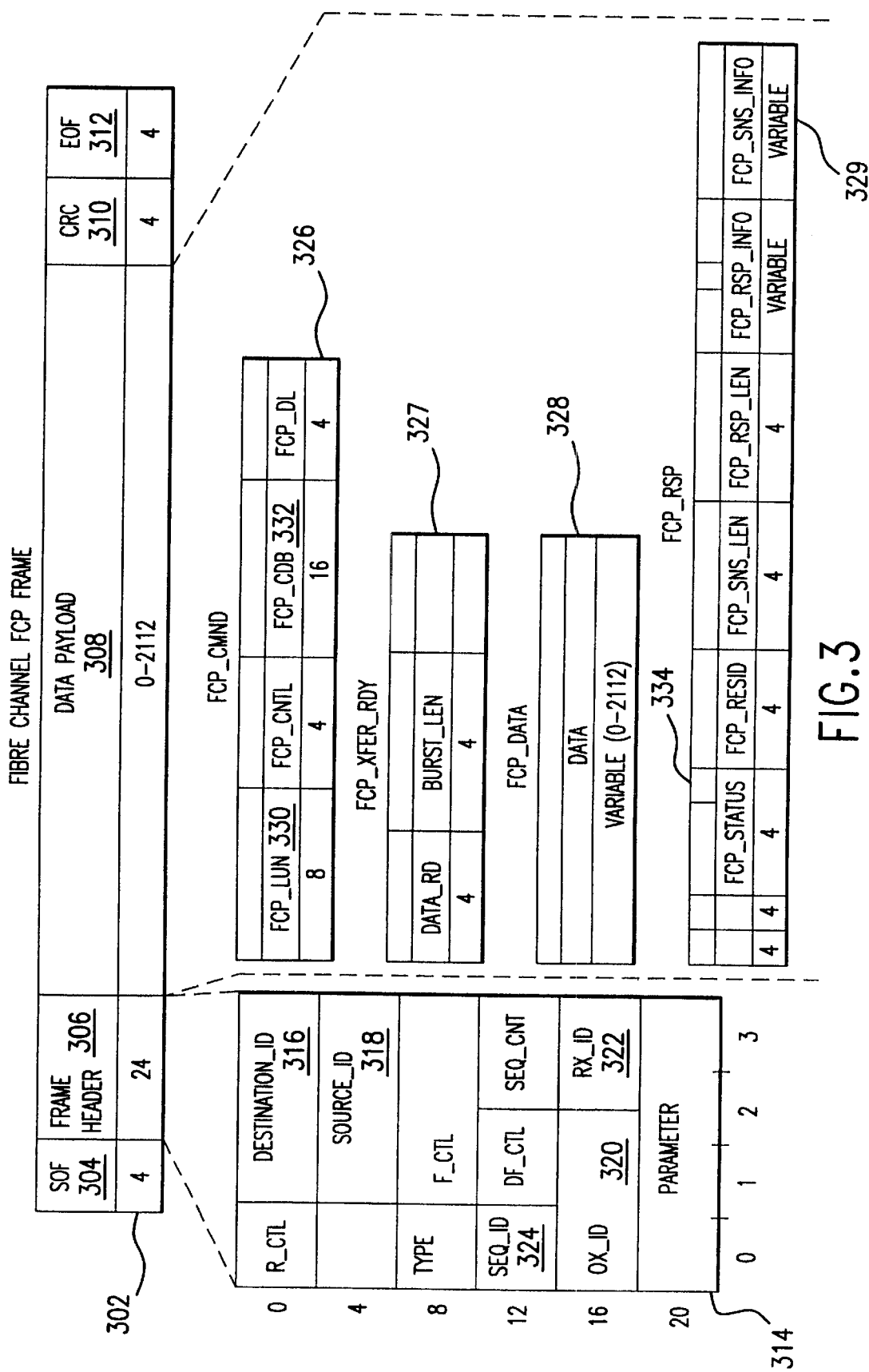
FIG. 3 shows the contents of a standard FC frame.

FIG. 3 shows the contents of a standard FC frame. The FC frame 302 comprises five high level sections 304, 306, 308, 310 and 312. The first high level section, called the start-of-frame deliminator 304, comprises 4 bytes that mark the beginning of the frame. The next high level section, called frame header 306, comprises 24 bytes that contain addressing information, sequence information, exchange information, and various control flags. A more detailed view of the frame header 314 is shown expanded from the FC frame 302 in FIG. 3. The destination identifier ("D_ID"), or DESTINATION_ID 316, is a 24-bit FC address indicating the destination FC port for the frame. The source identifier ("S_ID"), or SOURCE_ID 318, is a 24-bit address that indicates the FC port that transmitted the frame. The originator ID, or OX_ID 320, and the responder ID 322, or RX_ID, together compose a 32-bit exchange ID that identifies the exchange to which the frame belongs with respect to the originator, or initiator, and responder, or target, FC ports. The sequence ID, or SEQ_ID, 324 identifies the sequence to which the frame belongs.

The next high level section 308, called the data payload, contains the actual data packaged within the FC frame. The data payload contains data and encapsulating protocol information that is being transferred according to a higher-level protocol, such as IP and SCSI. FIG. 3 shows four basic types of data payload layouts 326–329 used for data transfer according to the SCSI protocol. The first of these formats 326, called the FCP_CMND, is used to send a SCSI command from an initiator to a target. The FCP_LUN field 330 comprises an 8-byte address that may, in certain implementations, specify a particular SCSI-bus adapter, a target device associated with that SCSI-bus adapter, and a logical unit number ("LUN") corresponding to a logical device associated with the specified target SCSI device that together represent the target for the FCP_CMND. In other implementations, the FCP_LUN field 330 contains an index or reference number that can be used by the target FC host adapter to determine the SCSI-bus adapter, a target device associated with that SCSI-bus adapter, and a LUN corresponding to a logical device associated with the specified target SCSI device. An actual SCSI command, such as a SCSI read or write I/O command, is contained within the 16-byte field FCP_CDB 332.

The second type of data payload format 327 shown in FIG. 3 is called the FCP_XFER_RDY layout. This data payload format is used to transfer a SCSI proceed command from the target to the initiator when the target is prepared to begin receiving or sending data. The third type of data payload format 328 shown in FIG. 3 is the FCP_DATA format, used for transferring the actual data that is being read or written as a result of execution of a SCSI I/O transaction. The final data payload format 329 shown in FIG. 3 is called the FCP_RSP layout, used to transfer a SCSI status byte 334, as well as other FCP status information, from the target back to the initiator upon completion of the I/O transaction.

The SCSI Bus Architecture

A computer bus is a set of electrical signal lines through which computer commands and data are transmitted between processing, storage, and input/output ("I/O") components of a computer system. The SCSI I/O bus is the most widespread and popular computer bus for interconnecting mass storage devices, such as hard disks and CD-ROM drives, with the memory and processing components of computer systems. The SCSI bus architecture is defined in three major standards: SCSI-1, SCSI-2 and SCSI-3. The SCSI-1 and SCSI-2 standards are published in the American National Standards Institute ("ANSI") standards documents "X3.131-1986," and "X3.131-1994," respectively. The SCSI-3 standard is currently being developed by an ANSI committee. An overview of the SCSI bus architecture is provided by "The SCSI Bus and IDE Interface," Freidhelm Schmidt, Addison-Wesley Publishing Company, ISBN 0-201-17514-2, 1997 ("Schmidt").

Figure 4:
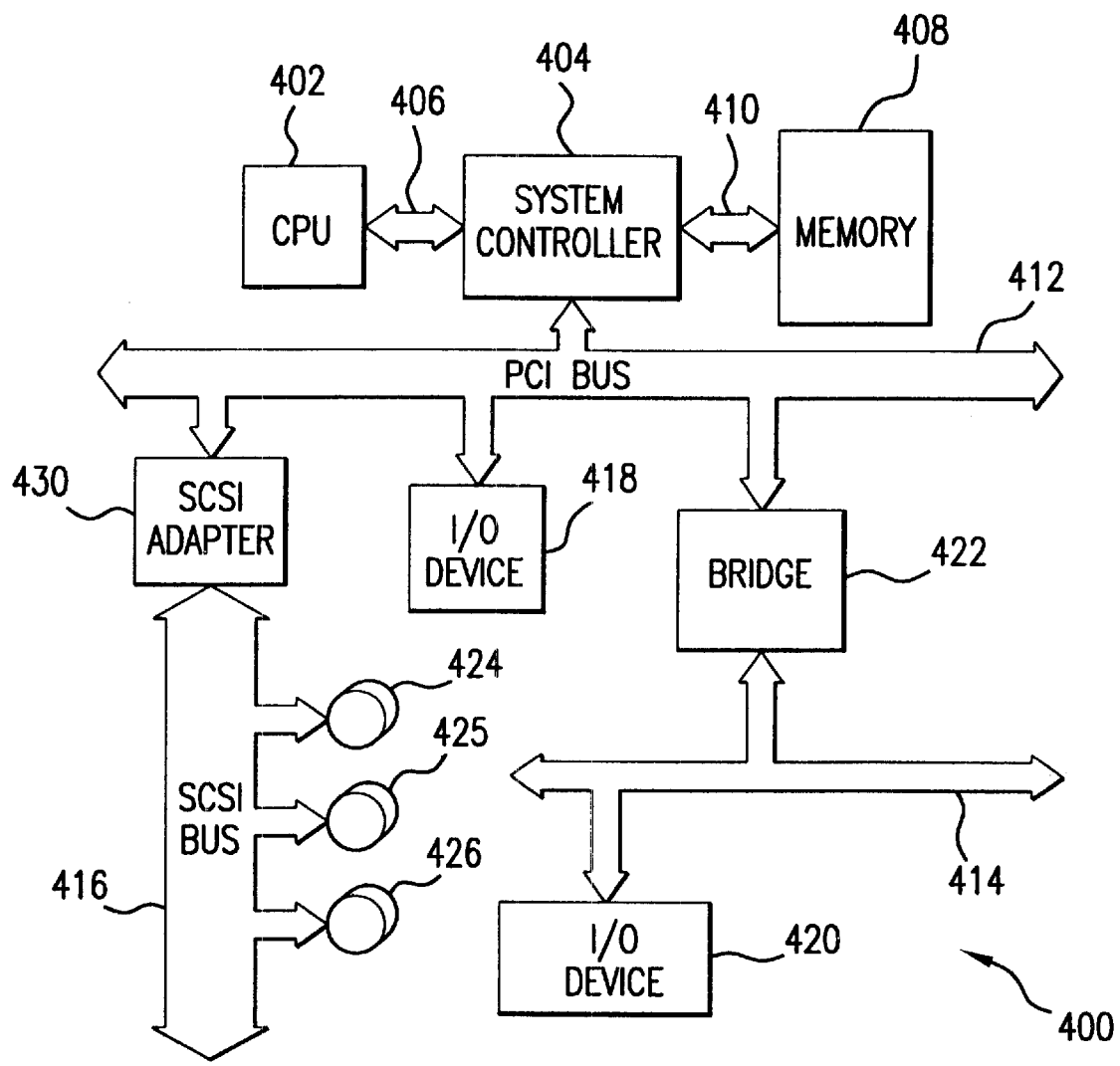
FIG. 4 is a block diagram of a common personal computer architecture including a SCSI bus.

FIG. 4 is a block diagram of a common personal computer ("PC") architecture including a SCSI bus. The PC 400 includes a central processing unit, or processor ("CPU") 402, linked to a system controller 404 by a high-speed CPU bus 406. The system controller is, in turn, linked to a system memory component 408 via a memory bus 410. The system controller 404 is, in addition, linked to various peripheral devices via a peripheral component interconnect ("PCI") bus 412 that is interconnected with a slower industry standard architecture ("ISA") bus 414 and a SCSI bus 416. The architecture of the PCI bus is described in "PCI System Architecture," Shanley & Anderson, Mine Share, Inc., Addison-Wesley Publishing Company, ISBN 0-201-40993-3, 1995. The interconnected CPU bus 406, memory bus 410, PCI bus 412, and ISA bus 414 allow the CPU to exchange data and commands with the various processing and memory components and I/O devices included in the computer system. Generally, very high-speed and high bandwidth I/O devices, such as a video display device 418, are directly connected to the PCI bus. Slow I/O devices 420, such as a keyboard 420 and a pointing device (not shown), are connected directly to the ISA bus 414. The ISA bus is interconnected with the PCI bus through a bus bridge component 422. Mass storage devices, such as hard disks, floppy disk drives, CD-ROM drives, and tape drives 424–426 are connected to the SCSI bus 416. The SCSI bus is interconnected with the PCI bus 412 via a SCSI-bus adapter 430. The SCSI-bus adapter 430 includes a processor component, such as processor selected from the Symbios family of 53C8xx SCSI processors, and interfaces to the PCI bus 412 using standard PCI bus protocols. The SCSI-bus adapter 430 interfaces to the SCSI bus 416 using the SCSI bus protocol that will be described, in part, below. The SCSI-bus adapter 430 exchanges commands and data with SCSI controllers (not shown) that are generally embedded within each mass storage device 424–426, or SCSI device, connected to the SCSI bus. The SCSI controller is a hardware/firmware component that interprets and responds to SCSI commands received from a SCSI adapter via the SCSI bus and that implements the SCSI commands by interfacing with, and controlling, logical devices. A logical device may correspond to one or more physical devices, or to portions of one or more physical devices. Physical devices include data storage devices such as disk, tape and CD-ROM drives.

Two important types of commands, called I/O commands, direct the SCSI device to read data from a logical device and write data to a logical device. An I/O transaction is the exchange of data between two components of the computer system, generally initiated by a processing component, such as the CPU 402, that is implemented, in part, by a read I/O command or by a write I/O command. Thus, I/O transactions include read I/O transactions and write I/O transactions.

The SCSI bus 416 is a parallel bus that can simultaneously transport a number of data bits. The number of data bits that can be simultaneously transported by the SCSI bus is referred to as the width of the bus. Different types of SCSI buses have widths of 8, 16 and 32 bits. The 16 and 32-bit SCSI buses are referred to as wide SCSI buses.

As with all computer buses and processors, the SCSI bus is controlled by a clock that determines the speed of operations and data transfer on the bus. SCSI buses vary in clock speed. The combination of the width of a SCSI bus and the clock rate at which the SCSI bus operates determines the number of bytes that can be transported through the SCSI bus per second, or bandwidth of the SCSI bus. Different types of SCSI buses have bandwidths ranging from less than 2 megabytes ("Mbytes") per second up to 40 Mbytes per second, with increases to 80 Mbytes per second and possibly 160 Mbytes per second planned for the future. The increasing bandwidths may be accompanied by increasing limitations in the physical length of the SCSI bus.

Figure 5:
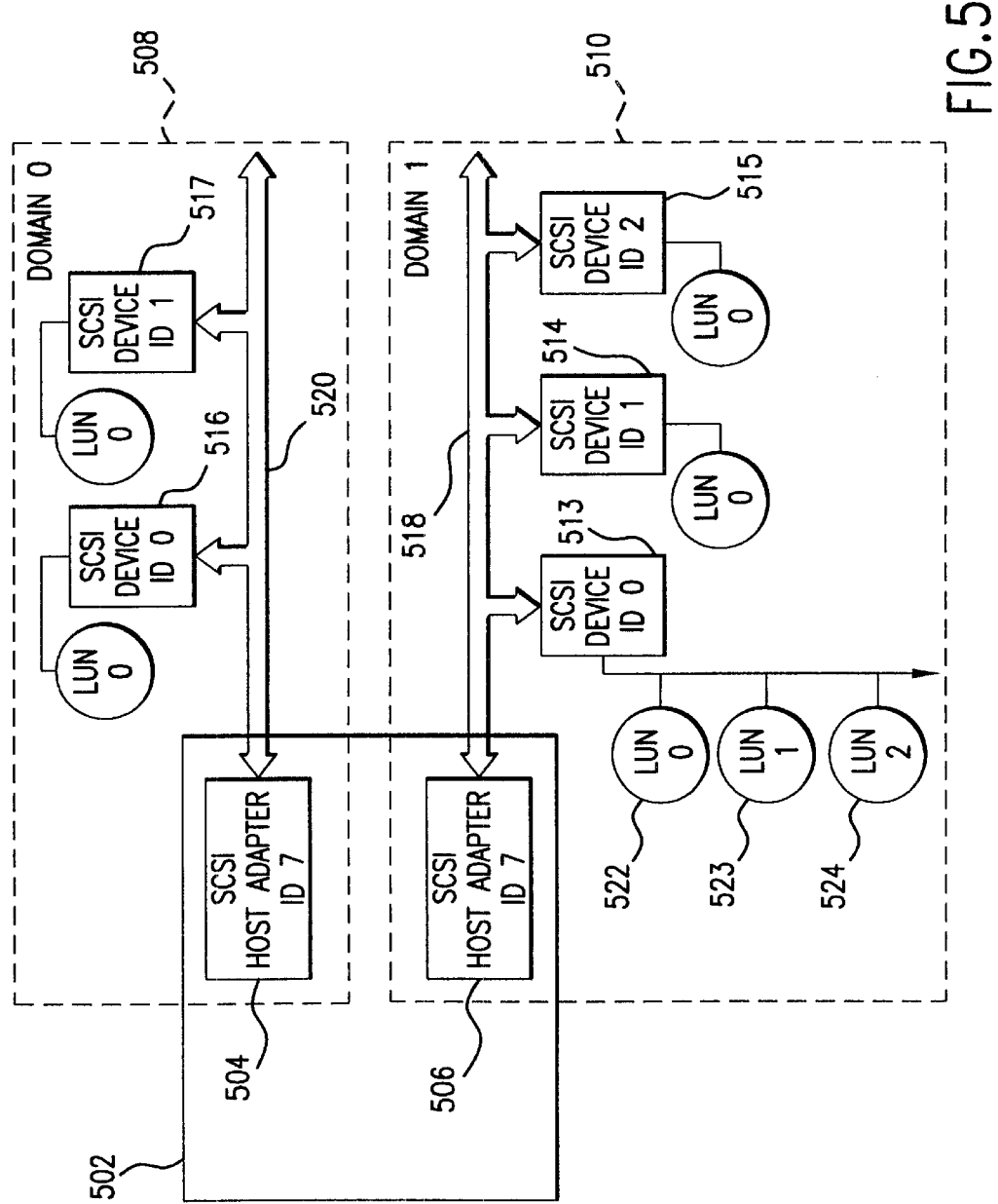
FIG. 5 illustrates the SCSI bus topology.

FIG. 5 illustrates the SCSI bus topology. A computer system 502, or other hardware system, may include one or more SCSI-bus adapters 504 and 506. The SCSI-bus adapter, the SCSI bus which the SCSI-bus adapter controls, and any peripheral devices attached to that SCSI bus together comprise a domain. SCSI-bus adapter 504 in FIG. 5 is associated with a first domain 508 and SCSI-bus adapter 506 is associated with a second domain 510. The most current SCSI-2 bus implementation allows fifteen different SCSI devices 513–515 and 516–517 to be attached to a single SCSI bus. In FIG. 5, SCSI devices 513–515 are attached to SCSI bus 518 controlled by SCSI-bus adapter 506, and SCSI devices 516–517 are attached to SCSI bus 520 controlled by SCSI-bus adapter 504. Each SCSI-bus adapter and SCSI device has a SCSI identification number, or SCSI_ID, that uniquely identifies the device or adapter in a particular SCSI bus. By convention, the SCSI-bus adapter has SCSI_ID 7, and the SCSI devices attached to the SCSI bus have SCSIUIDs ranging from 0 to 6 and from 8 to 15. A SCSI device, such as SCSI device 513, may interface with a number of logical devices, each logical device comprising portions of one or more physical devices. Each logical device is identified by a logical unit number ("LUN") that uniquely identifies the logical device with respect to the SCSI device that controls the logical device. For example, SCSI device 513 controls logical devices 522–524 having LUNs 0, 1, and 2, respectively. According to SCSI terminology, a device that initiates an I/O command on the SCSI bus is called an initiator, and a SCSI device that receives an I/O command over the SCSI bus that directs the SCSI device to execute an I/O operation is called a target.

In general, a SCSI-bus adapter, such as SCSI-bus adapters 504 and 506, initiates I/O operations by sending commands to target devices. The target devices 513–515 and 516–517 receive the I/O commands from the SCSI bus. The target devices 513–515 and 516–517 then implement the commands by interfacing with one or more logical devices that they control to either read data from the logical devices and return the data through the SCSI bus to the initiator or to write data received through the SCSI bus from the initiator to the logical devices. Finally, the target devices 513–515 and 516–517 respond to the initiator through the SCSI bus with status messages that indicate the success or failure of implementation of the commands.

FIGS. 6A–6C illustrate the SCSI protocol involved in the initiation and implementation of read and write I/O operations. Read and write I/O operations compose the bulk of I/O operations performed by SCSI devices. Efforts to maximize the efficiency of operation of a system of mass storage devices interconnected by a SCSI bus are most commonly directed toward maximizing the efficiency at which read and write I/O operations are performed. Thus, in the discussions to follow, the architectural features of various hardware devices will be discussed in terms of read and write operations.

FIG. 6A shows the sending of a read or write I/O command by a SCSI initiator, most commonly a SCSI-bus adapter, to a SCSI target, most commonly a SCSI controller embedded in a SCSI device associated with one or more logical devices. The sending of a read or write I/O command is called the command phase of a SCSI I/O operation. FIG. 6A is divided into initiator 602 and target 604 sections by a central vertical line 606. Both the initiator and the target sections include columns entitled "state" 606 and 608 that describe the state of the SCSI bus and columns entitled "events" 610 and 612 that describe the SCSI bus events associated with the initiator and the target, respectively. The bus states and bus events involved in the sending of the I/O command are ordered in time, descending from the top of FIG. 6A to the bottom of FIG. 6A. FIGS. 6B–6C also adhere to this above-described format.

The sending of an I/O command from an initiator SCSI-bus adapter to a target SCSI device, illustrated in FIG. 6A, initiates a read or write I/O operation by the target SCSI device. Referring to FIG. 4, the SCSI-bus adapter 430 initiates the I/O operation as part of an I/O transaction. Generally, the SCSI-bus adapter 430 receives a read or write command via the PCI bus 412, system controller 404, and CPU bus 406, from the CPU 402 directing the SCSI-bus adapter to perform either a read operation or a write operation. In a read operation, the CPU 402 directs the SCSI-bus adapter 430 to read data from a mass storage device 424–426 and transfer that data via the SCSI bus 416, PCI bus 412, system controller 404, and memory bus 410 to a location within the system memory 408. In a write operation, the CPU 402 directs the system controller 404 to transfer data from the system memory 408 via the memory bus 410, system controller 404, and PCI bus 412 to the SCSI-bus adapter 430, and directs the SCSI-bus adapter 430 to send the data via the SCSI bus 416 to a mass storage device 424426 on which the data is written.

FIG. 6A starts with the SCSI bus in the BUS FREE state 614, indicating that there are no commands or data currently being transported on the SCSI device. The initiator, or SCSI-bus adapter, asserts the BSY, D7 and SEL signal lines of the SCSI bus in order to cause the bus to enter the ARBITRATION state 616. In this state, the initiator announces to all of the devices an intent to transmit a command on the SCSI bus. Arbitration is necessary because only one device may control operation of the SCSI bus at any instant in time. Assuming that the initiator gains control of the SCSI bus, the initiator then asserts the ATN signal line and the DX signal line corresponding to the target SCSI_ID in order to cause the SCSI bus to enter the SELECTION state 618. The initiator or target asserts and drops various SCSI signal lines in a particular sequence in order to effect a SCSI bus state change, such as the change of state from the ARBITRATION state 616 to the SELECTION state 618, described above. These sequences can be found in Schmidt and in the ANSI standards, and will therefore not be further described below.

When the target senses that the target has been selected by the initiator, the target assumes control 620 of the SCSI bus in order to complete the command phase of the I/O operation. The target then controls the SCSI signal lines in order to enter the MESSAGE OUT state 622. In a first event that occurs in the MESSAGE OUT state, the target receives from the initiator an IDENTIFY message 623. The IDENTIFY message 623 contains a LUN field 624 that identifies the LUN to which the command message that will follow is addressed. The IDENTIFY message 623 also contains a flag 625 that is generally set to indicate to the target that the target is authorized to disconnect from the SCSI bus during the target's implementation of the I/O command that will follow. The target then receives a QUEUE TAG message 626 that indicates to the target how the I/O command that will follow should be queued, as well as providing the target with a queue tag 627. The queue tag is a byte that identifies the I/O command. A SCSI-bus adapter can therefore concurrently manage 656 different I/O commands per LUN. The combination of the SCSI_ID of the initiator SCSI-bus adapter, the SCSI_ID of the target SCSI device, the target LUN, and the queue tag together comprise an I_T_LQ nexus reference number that uniquely identifies the I/O operation corresponding to the I/O command that will follow within the SCSI bus. Next, the target device controls the SCSI bus signal lines in order to enter the COMMAND state 628. In the COMMAND state, the target solicits and receives from the initiator the I/O command 630. The I/O command 630 includes an opcode 632 that identifies the particular command to be executed, in this case a read command or a write command, a logical block number 636 that identifies the logical block of the logical device that will be the beginning point of the read or write operation specified by the command, and a data length 638 that specifies the number of blocks that will be read or written during execution of the command.

When the target has received and processed the I/O command, the target device controls the SCSI bus signal lines in order to enter the MESSAGE IN state 640 in which the target device generally sends a disconnect message 642 back to the initiator device. The target disconnects from the SCSI bus because, in general, the target will begin to interact with the logical device in order to prepare the logical device for the read or write operation specified by the command. The target may need to prepare buffers for receiving data, and, in the case of disk drives or CD-ROM drives, the target device may direct the logical device to seek to the appropriate block specified as the starting point for the read or write command. By disconnecting, the target device frees up the SCSI bus for transportation of additional messages, commands, or data between the SCSI-bus adapter and the target devices. In this way, a large number of different I/O operations can be concurrently multiplexed over the SCSI bus. Finally, the target device drops the BSY signal line in order to return the SCSI bus to the BUS FREE state 644. The target device then prepares the logical device for the read or write operation. When the logical device is ready for reading or writing data, the data phase for the I/O operation ensues. FIG. 6B illustrates the data phase of a SCSI I/O operation. The SCSI bus is initially in the BUS FREE state 646. The target device, now ready to either return data in response to a read I/O command or accept data in response to a write I/O command, controls the SCSI bus signal lines in order to enter the ARBITRATION state 648. Assuming that the target device is successful in arbitrating for control of the SCSI bus, the target device controls the SCSI bus signal lines in order to enter the RESELECTION state 650. The RESELECTION state is similar to the SELECTION state, described in the above discussion of FIG. 6A, except that it is the target device that is making the selection of a SCSI-bus adapter with which to communicate in the RESELECTION state, rather than the SCSI-bus adapter selecting a target device in the SELECTION state.

Once the target device has selected the SCSI-bus adapter, the target device manipulates the SCSI bus signal lines in order to cause the SCSI bus to enter the MESSAGE IN state 652. In the MESSAGE IN state, the target device sends both an IDENTIFY message 654 and a QUEUE TAG message 656 to the SCSI-bus adapter. These messages are identical to the IDENTIFY and QUEUE TAG messages sent by the initiator to the target device during transmission of the I/O command from the initiator to the target, illustrated in FIG. 6A. The initiator may use the I_T_L_Q nexus reference number, a combination of the SCSI_IDs of the initiator and target device, the target LUN, and the queue tag contained in the QUEUE TAG message, to identify the I/O transaction for which data will be subsequently sent from the target to the initiator, in the case of a read operation, or to which data will be subsequently transmitted by the initiator, in the case of a write operation. The I_T_L_Q nexus reference number is thus an I/O operation handle that can be used by the SCSI-bus adapter as an index into a table of outstanding I/O commands in order to locate the appropriate buffer for receiving data from the target device, in case of a read, or for transmitting data to the target device, in case of a write.

After sending the IDENTIFY and QUEUE TAG messages, the target device controls the SCSI signal lines in order to transition to a DATA state 658. In the case of a read I/O operation, the SCSI bus will transition to the DATA IN state. In the case of a write I/O operation, the SCSI bus will transition to a DATA OUT state. During the time that the SCSI bus is in the DATA state, the target device will transmit, during each SCSI bus clock cycle, a data unit having a size, in bits, equal to the width of the particular SCSI bus on which the data is being transmitted. In general, there is a SCSI bus signal line handshake involving the signal lines ACK and REQ as part of the transfer of each unit of data. In the case of a read I/O command, for example, the target device places the next data unit on the SCSI bus and asserts the REQ signal line. The initiator senses assertion of the REQ signal line, retrieves the transmitted data from the SCSI bus, and asserts the ACK signal line to acknowledge receipt of the data. This type of data transfer is called asynchronous transfer. The SCSI bus protocol also allows for the target device to transfer a certain number of data units prior to receiving the first acknowledgment from the initiator. In this transfer mode, called synchronous transfer, the latency between the sending of the first data unit and receipt of acknowledgment for that transmission is avoided. During data transmission, the target device can interrupt the data transmission by sending a SAVE POINTERS message followed by a DISCONNECT message to the initiator and then controlling the SCSI bus signal lines to enter the BUS FREE state. This allows the target device to pause in order to interact with the logical devices which the target device controls before receiving or transmitting further data. After disconnecting from the SCSI bus, the target device may then later again arbitrate for control of the SCSI bus and send additional IDENTIFY and QUEUE TAG messages to the initiator so that the initiator can resume data reception or transfer at the point that the initiator was interrupted. An example of disconnect and reconnect 660 are shown in FIG. 3B interrupting the DATA state 658. Finally, when all the data for the I/O operation has been transmitted, the target device controls the SCSI signal lines in order to enter the MESSAGE IN state 662, in which the target device sends a DISCONNECT message to the initiator, optionally preceded by a SAVE POINTERS message. After sending the DISCONNECT message, the target device drops the BSY signal line so the SCSI bus transitions to the BUS FREE state 664.

Following the transmission of the data for the I/O operation, as illustrated in FIG. 6B, the target device returns a status to the initiator during the status phase of the I/O operation. FIG. 6C illustrates the status phase of the I/O operation. As in FIGS. 6A–6B, the SCSI bus transitions from the BUS FREE state 666 to the ARBITRATION state 668, RESELECTION state 670, and MESSAGE IN state 672, as in FIG. 3B. Following transmission of an IDENTIFY message 674 and QUEUE TAG message 676 by the target to the initiator during the MESSAGE IN state 672, the target device controls the SCSI bus signal lines in order to enter the STATUS state 678. In the STATUS state 678, the target device sends a single status byte 684 to the initiator to indicate whether or not the I/O command was successfully completed. In FIG. 6C, the status byte 680 corresponding to a successful completion, indicated by a status code of 0, is shown being sent from the target device to the initiator. Following transmission of the status byte, the target device then controls the SCSI bus signal lines in order to enter the MESSAGE IN state 682, in which the target device sends a COMMAND COMPLETE message 684 to the initiator. At this point, the I/O operation has been completed. The target device then drops the BSY signal line so that the SCSI bus returns to the BUS FREE state 686. The SCSI-bus adapter can now finish its portion of the I/O command, free up any internal resources that were allocated in order to execute the command, and return a completion message or status back to the CPU via the PCI bus.

Mapping the SCSI Protocol onto FCP

Figure 7B:
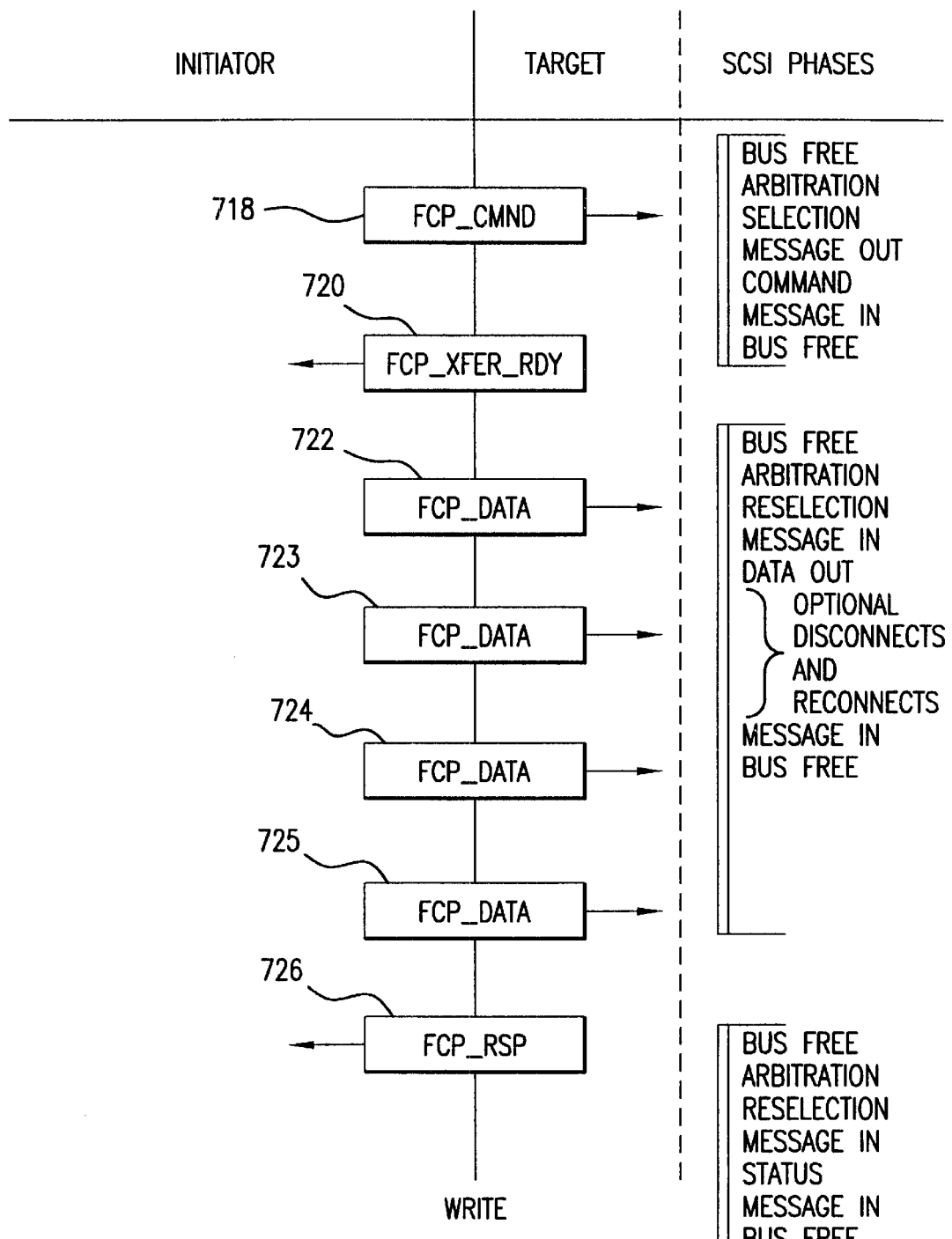

FIGS. 7A and 7B illustrate a mapping of FCP sequences exchanged between an initiator and target and the SCSI bus phases and states described in FIGS. 6A–6C. In FIGS. 7A–7B, the target SCSI adapter is assumed to be packaged together with a FCP host adapter, so that the target SCSI adapter can communicate with the initiator via the FC and with a target SCSI device via the SCSI bus. FIG. 7A shows a mapping between FCP sequences and SCSI phases and states for a read I/O transaction. The transaction is initiated when the initiator sends a single-frame FCP sequence containing a FCP_CMND data payload through the FC to a target SCSI adapter 702. When the target SCSI-bus adapter receives the FCP_CMND frame, the target SCSI-bus adapter proceeds through the SCSI states of the command phase 704 illustrated in FIG. 6A, including ARBITRATION, RESELECTION, MESSAGE OUT, COMMAND, and MESSAGE IN. At the conclusion of the command phase, as illustrated in FIG. 6A, the SCSI device that is the target of the I/O transaction disconnects from the SCSI bus in order to free up the SCSI bus while the target SCSI device prepares to execute the transaction. Later, the target SCSI device rearbitrates for SCSI bus control and begins the data phase of the I/O transaction 706. At this point, the SCSI-bus adapter may send a FCP_XFER_RDY single-frame sequence 708 back to the initiator to indicate that data transmission can now proceed. In the case of a read I/O transaction, the FCP_XFER_RDY single-frame sequence is optional. As the data phase continues, the target SCSI device begins to read data from a logical device and transmit that data over the SCSI bus to the target SCSI-bus adapter. The target SCSI-bus adapter then packages the data received from the target SCSI device into a number of FCP_DATA frames that together compose the third sequence of the exchange corresponding to the I/O read transaction, and transmits those FCP_DATA frames back to the initiator through the FC. When all the data has been transmitted, and the target SCSI device has given up control of the SCSI bus, the target SCSI device then again arbitrates for control of the SCSI bus to initiate the status phase of the I/O transaction 714. In this phase, the SCSI bus transitions from the BUS FREE state through the ARBITRATION, RESELECTION, MESSAGE IN, STATUS, MESSAGE IN and BUS FREE states, as illustrated in FIG. 3C, in order to send a SCSI status byte from the target SCSI device to the target SCSI-bus adapter. Upon receiving the status byte, the target SCSI-bus adapter packages the status byte into an FCP_RSP single-frame sequence 716 and transmits the FCP_RSP single-frame sequence back to the initiator through the FC. This completes the read I/O transaction.

In many computer systems, there may be additional internal computer buses, such as a PCI bus, between the target FC host adapter and the target SCSI-bus adapter. In other words, the FC host adapter and SCSI adapter may not be packaged together in a single target component. In the interest of simplicity, that additional interconnection is not shown in FIGS. 7A–B.

FIG. 7B shows, in similar fashion to FIG. 7A, a mapping between FCP sequences and SCSI bus phases and states during a write I/O transaction indicated by a FCP_CMND frame 718. FIG. 7B differs from FIG. 7A only in the fact that, during a write transaction, the FCP_DATA frames 722–725 are transmitted from the initiator to the target over the FC and the FCP_XFER_RDY single-frame sequence 720 sent from the target to the initiator 720 is not optional, as in the case of the read I/O transaction, but is instead mandatory. As in FIG. 7A, the write I/O transaction includes when the target returns an FCP_RSP single-frame sequence 726 to the initiator.

The TachLite FC Mass Storage Interface Controller and TachLite Interface

The Tachyon TL FC Mass Storage Interface Controller ("TL") is a high-performance, low-cost, loop-based interface controller for use in the FC ports that interconnect peripheral devices and computers to an FC arbitrated loop. In this subsection, an overview of the functionality of, and interface to, the TL will be presented. A more detailed description of the TL is included in U.S. Patent Application Ser. No. 09/183,865, entitled "Fibre Channel Controller," assigned to the Hewlett Packard Company, and filed on Oct. 30, 1998 that is hereby incorporated by reference in its entirety.

Figure 8:
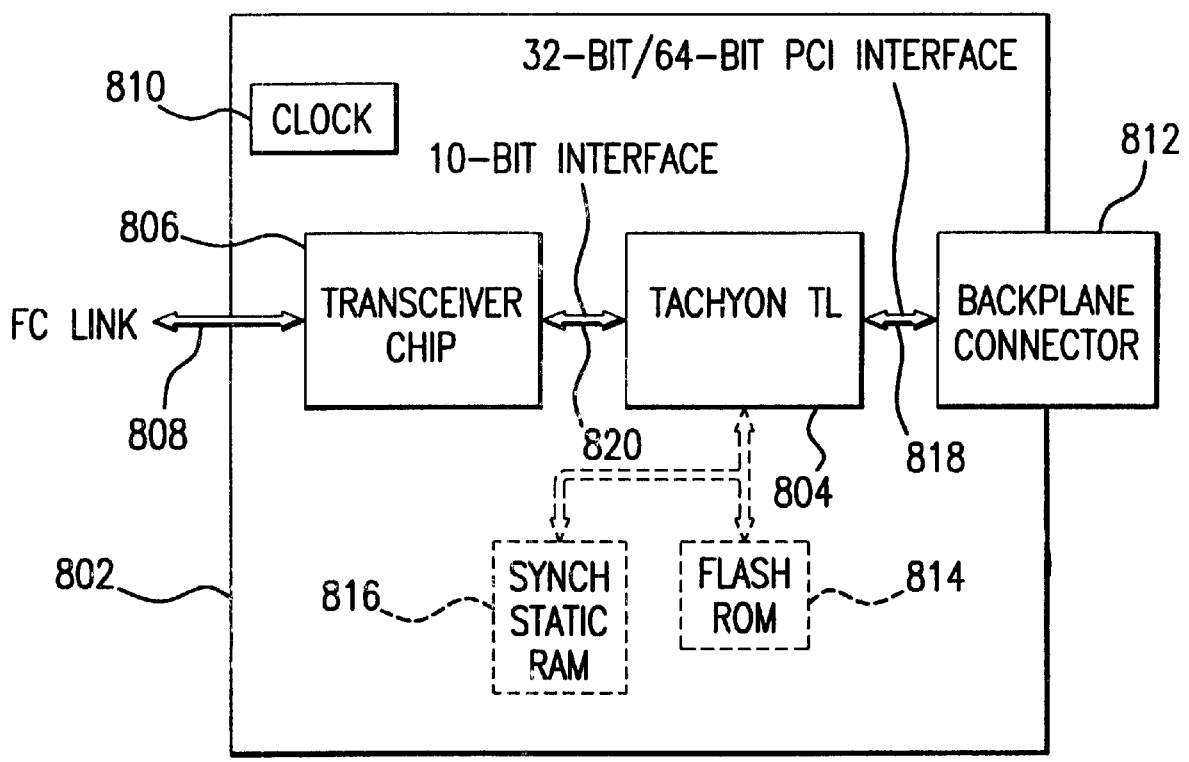
FIG. 8 shows a Tachyon TL FC Mass Storage Interface Controller incorporated into a typical FC/PCI host adapter.

FIG. 8 shows a TL incorporated into a typical FC/PCI host adapter. The FC/PCI host adapter 802 comprises a TL 804, a transceiver chip 806, an FC link 808, a clock 810, a backplane connector 812, and, optionally, a boot flash ROM 814, or a local synchronous static random access memory ("RAM") 816. The FC host adapter 802 communicates with the processor or processors of an FC node via the backplane connector 812 and a PCI bus within the FC node to which the processor or processors are coupled. The TL 804 is coupled to the backplane connector 812 via a PCI interface 818. The TL sends and receives FC frames to and from an FC arbitrated loop via a 10-bit interface 820 that couples the TL to the transceiver chip 806, which is, in turn, coupled to the FC arbitrated loop via the FC link 808. The clock 810 interfaces to the FC link. The FC host adapter 802 may serve, in terms of the previous discussion, as an NL_Port, and the FC host adapter 802, together with the computer system to which it is coupled via the backplane connector 812, compose an FC node that may be connected via the FC link 808 to an FC arbitrated loop topology.

Figure 9:
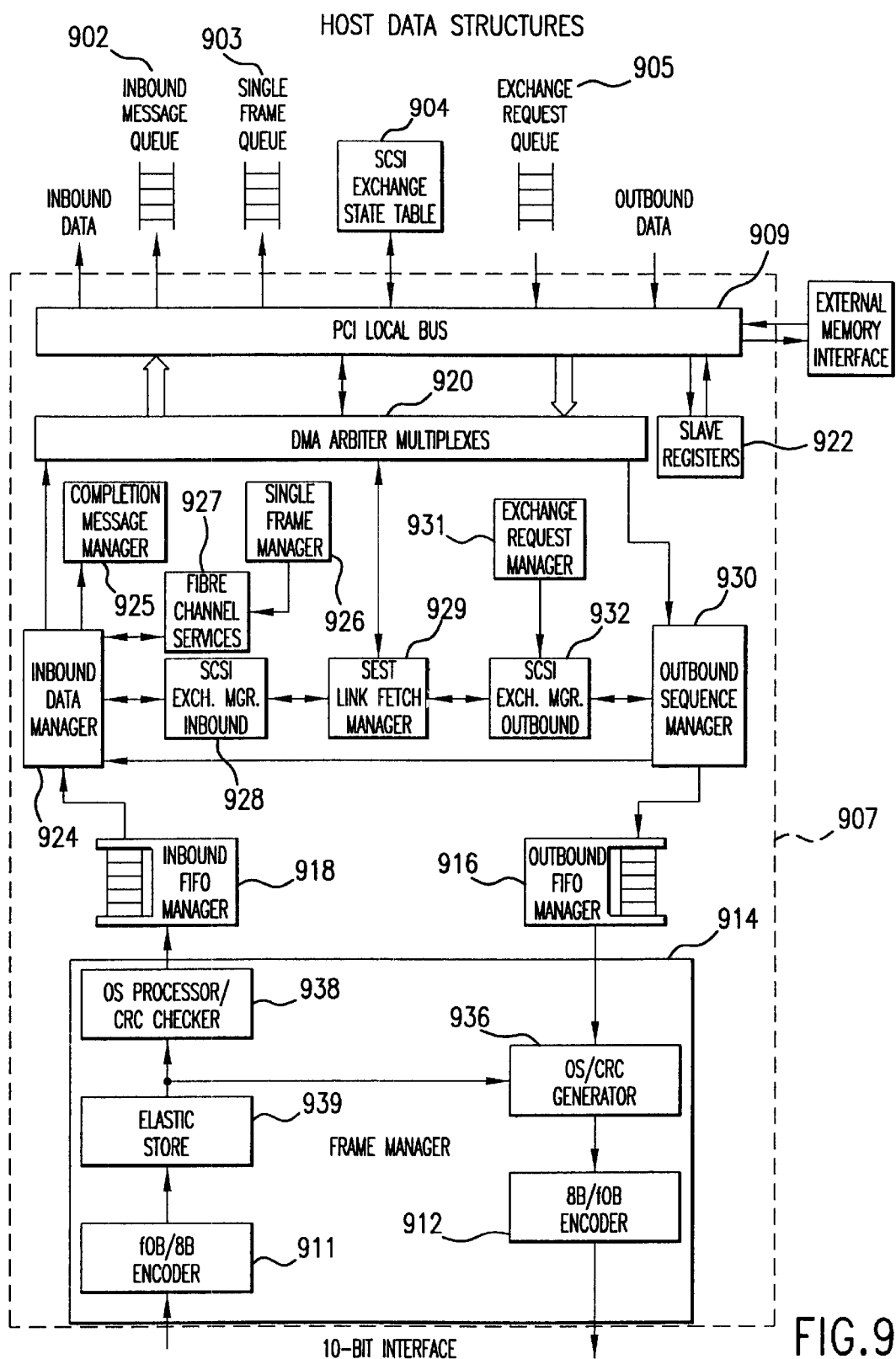
FIG. 9 shows a block diagram description of the Tachyon TL FC Mass Storage Interface Controller and the memory-based data structure interface between the TachLite FC Mass Storage Interface Controller and the host.

FIG. 9 shows a block diagram description of the TL and the memory-based data structure interface between the TL and the host to which the TL is interconnected by a PCI bus. The memory-based data structures 902–905 are maintained in a memory component of the FC node that is accessible to the TL 907 via the PCI bus 909. In FIG. 9, the TL 907 is represented as being combined with the backplane connector (812 in FIG. 8) and PCI bus 909. The TL interfaces with a transceiver chip (806 in FIG. 8) via a 10 bit/8 bit decoder 911, for receiving inbound frames from the transceiver chip (806 in FIG. 8) and via an 8 bit/10 bit encoder 912 for outbound frames transmitted by the TL to the transceiver chip. The 10 bit/8 bit decoder 911 and 8 bit/10 bit encoder 912 are both subcomponents of the frame manager 914 that receives FC frames for transmission to the transceiver chip (806 in FIG. 8) from the TL via the outbound FIFO manager 916 and that receives a stream of data bits from the transceiver chip (806 in FIG. 8) via the 10 bit/8 bit decoder 911, processes the received data bits into FC frames, and stores the FC frames into the inbound FIFO manager 918. The other frame manager components 934, 936, and 938 buffer received data when the lack of clock synchronization between the transmitter and receiver components of the transceiver chip prevent immediate processing of the received data, generate FCP CRCs, and check FCP CRCs, respectively, The DMA arbiter multiplexer 920 manages multiple internal DMA requests to the PCI local bus and the external memory interface. Internal block arbitration, as well as data path multiplexing, occurs in this block.

The processor or processors of the FC node control and exchange information with the TL by writing and reading various control registers 922 and by placing data into, and removing data from, the memory-based data structures 902–905. Internal components of the TL 924–932 read and write the control registers 922, receive data from, and place into, the memory based data structures 902–905, and exchange FC frames with the frame manager 914 via the inbound FIFO manager 918 and the outbound FIFO manager 916.

The inbound message queue ("IMQ") 902 contains completion messages that notify the host processor or processors of inbound and outbound transaction information and status information. The single frame queue ("SFQ") contains inbound unknown or unassisted FC frames that the TL 907 receives from the frame manager 914 and places into the SFQ. The SCSI exchange state table ("SEST") 904 is shared between the TL and the host and contains SEST entries that each corresponds to a current SCSI exchange (I/O operation). The exchange request queue ("ERQ") 905 contains I/O request blocks ("IRBs") that represent I/O requests sent by the host to the TL.

The completion message manager 925 manages the IMQ and provides queue entries to the inbound data manager 924 into which the inbound data manager places completion messages. The single frame manager 926 manages the SFQ in host memory and provides entries to the fibre channel services component 927 into which the fibre channel component services place inbound frames. The exchange request manager 931 fetches new entries from the ERQ and sends them to the SCSI exchange manger-outbound ("SEM-OUT") for processing. The inbound data manager 924 informs the inbound frame processors, i.e. the SCSI exchange manager-inbound ("SEM-IN") 928 and fibre channel services component 927, of new frames and routes the frames to their proper destination in the host. Also, the inbound data manager sends completion messages to the host via the IMQ. The fibre channel services component 927 manages the fibre channel frames that the SEM-IN 928 does not manage. The fibre channel services component places the frames in the SFQ. The SEM-IN 928 manages the phases of a SCSI exchange that receive a fibre channel sequence. The SEM-IN reads the SEST entries via the SEST link fetch manager 929 and either sends the inbound data to the proper host buffers or sends the request to the SEM-OUT 932 to send the next phases of fibre channel sequence. The SEST link fetch manager 929 is responsible for reading and writing SEST entries, depending upon requests from the SEM-IN 928 and SEMOUT 932 components. The SEM-OUT 932 manages the phases of a SCSI exchange that require a fibre channel sequence to be sent. The SEM-OUT 932 reads the SEST entries via the SEST link fetch manager 929, builds the request to send those sequences, and sends the requests to the outbound sequence manager 930. The outbound sequence manager ("OSM") 930 processes requests from the SEM-OUT 932 to send fibre channel sequences from the host and retrieves fibre channel frame headers and payloads from the host to send to the remote node. The OSM segments the sequence into fibre channel frames of up to 1 KByte in size and queues them into the outbound FIFO manager 916.

Figure 10:
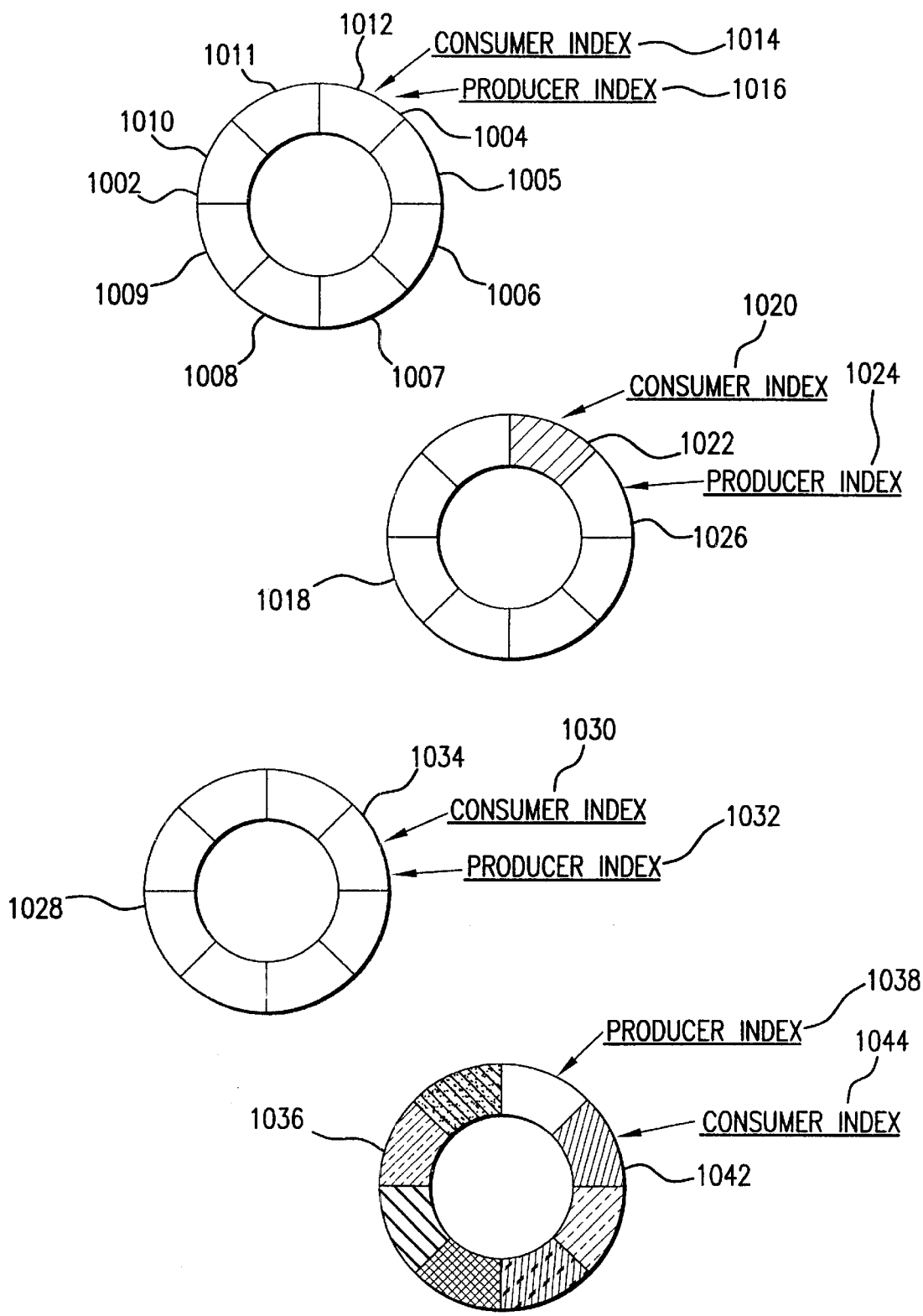
FIG. 10 shows the basic underlying circular queue data structure used in the TachLite Fibre Channel Mass Storage Interface Controller interface.

The IMQ 902, SFQ 903, and ERQ 905 are implemented as circular queues. FIG. 10 shows the basic underlying circular queue data structure used in the TL controller interface. A circular queue is a first-in-first-out ("FIFO") queue that is logically represented in a circular fashion, such as the depiction of the circular queue 1002 at the top of FIG. 10. Each radial section 1004–1012, or slot, of a circular queue contains space for a queue entry, essentially a record-like data structure containing one or more data fields. The circular queue 1002 in FIG. 10 is shown with 8 queue entry slots 1004–1012 although, in practice, a circular queue may have many tens or hundreds of queue entries. In addition to the queue entry slots, a circular queue is associated with two pointers: (1) a consumer index that points to the next queue entry that can be removed from the circular queue by a consumer of queue entries; and (2) a producer index that points to the next open slot within the circular queue in which a producer can place a queue entry to be added to the queue. In an empty circular queue 1402, in which all the queue entry slots are available for placement of data by a producer and in which none of the queue entry slots contain valid queue entries to be consumed by a consumer, both the consumer index 1014 and the producer index 1016 point to the same empty queue entry slot 1012.

When a producer adds a queue entry to an empty circular queue 1002, a circular queue with one valid queue entry 1018 is produced. The consumer index 1020 is not changed, as a result of which the consumer index points to the single valid queue entry 1022 in the circular queue 1018. After the producer inserts the queue entry 1022, the producer increments the producer index 1024 to point to the next available slot 1026 within the circular queue 1018 into which the producer can add a second queue entry. If the consumer now removes the single queue entry 1022, an empty circular queue 1028 is produced. When the consumer has removed the available queue entry 1022, the consumer increments the consumer index 1030. As in the previous depiction of an empty circular queue 1002, the empty circular queue 1028 produced by removing the single queue entry 1022 has both the consumer index 1030 and the producer index 1032 pointing to the same empty, available queue entry slot 1034. If a producer successively adds queue entries at a faster rate than a consumer can consume them, a full circular queue 1036 will eventually be produced. In a full circular queue 1036, the producer index 1038 points to a single empty queue entry slot within the circular queue that immediately precedes the first available valid queue entry 1042 pointed to by the consumer index 1044.

Figure 11:
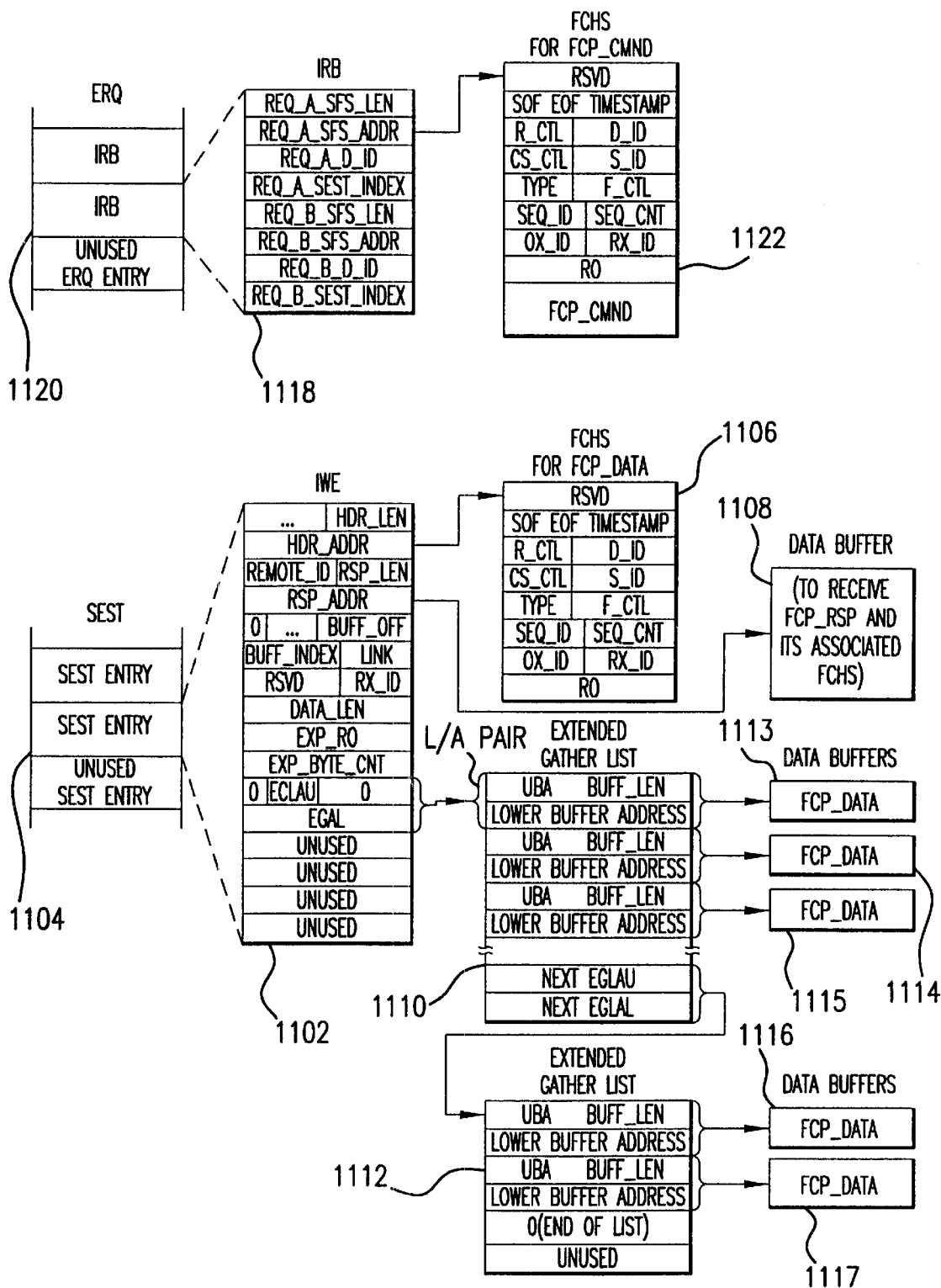
FIG. 11 shows a detailed view of the host memory data structures required to perform an initiated FC Protocol for SCSI write operation from four or more data buffers.

FIG. 11 shows a more detailed view of the host memory data structures required to perform an FCP write operation where the FC node in which a TL resides is the initiator of the FCP write operation and where the data payload that will include the data to be written requires 4 or more data buffers. The host prepares an initiator write entry ("IWE") 1102 within a SEST entry 1104 in the SEST (904 in FIG. 9). Associated with the IWE are: (1) a fibre channel header structure ("FCHS") 1106 that is used to send the FCP DATA sequence; (2) a data buffer 1108 that is used to receive the FCP_RSP frame from the SCSI target; and (3) one or more extended scatter gather list ("SGL") pages 1110 and 1112 that contain pointers to data buffers 1113–1117 in which the host places the data to be written to the SCSI target via the FCP_DATA sequence. The host then creates an I/O request block ("IRB") 1118 in an unused ERQ entry 1120 and associates the IRB with an FCHS 1122 that is used for the FCP_CMND sequence. The host then increments the ERQ producer index. The producer index increment is detected by the TL, and the TL then launches the FCP write operation. The TL uses the information and data stored within the IRB 1118 and RWE 1102, and the data structures associated with the IRB and RWE, to conduct the entire FCP write operation, including the FCP_CMND sequence, the FCP_XFER_RDY sequence, and the FCP_DATA sequence. The TL receives from the target a FCP_RSP sequence at the completion of the FCP write operation.

Figure 12:
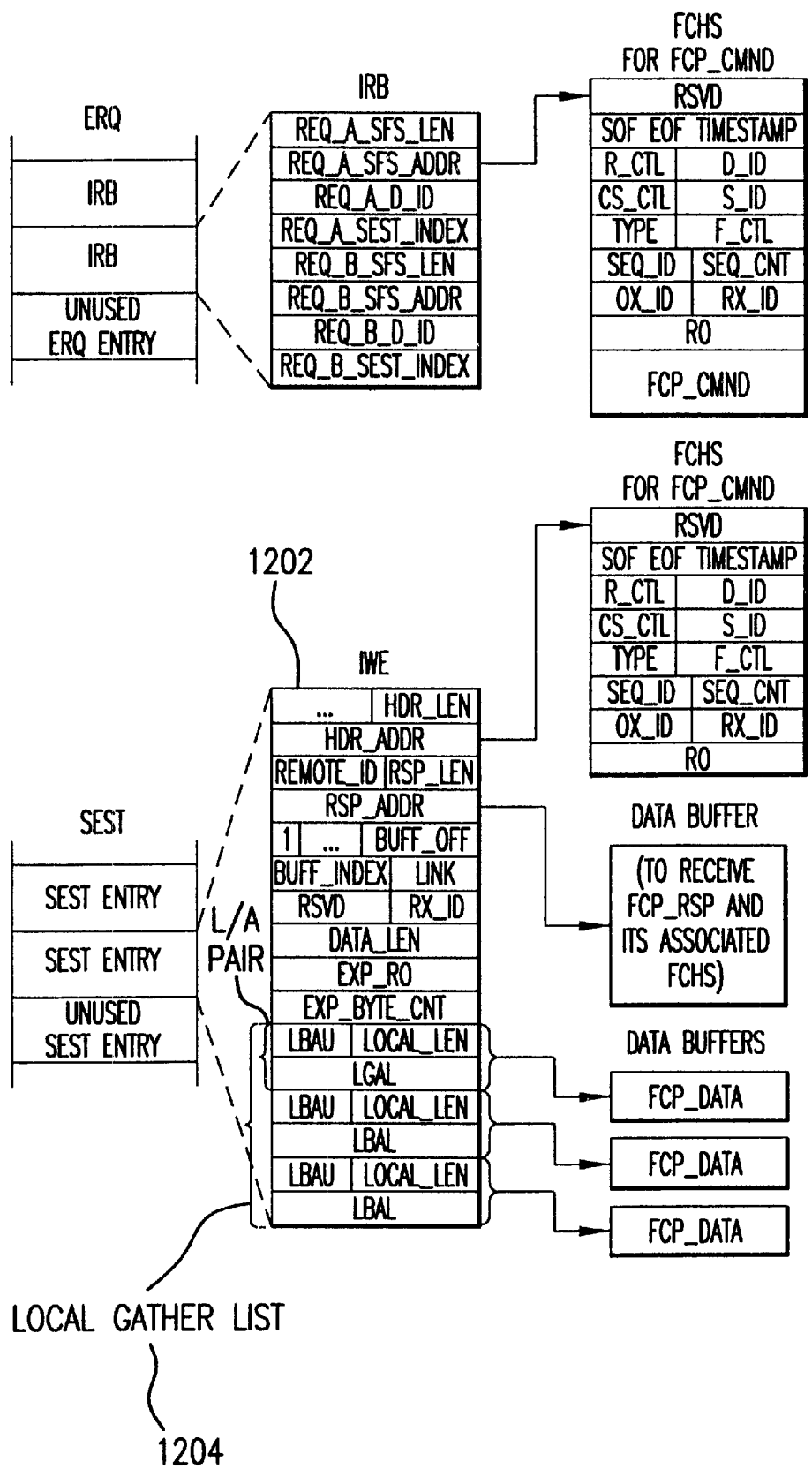
FIG. 12 shows the host memory data structures required to perform an initiated FC Protocol for SCSI write operation from three or less data buffers.

FIG. 12 shows the host memory data structures required to perform an FCP write operation where the FC node within which the TL resides is the initiator of the FCP write operation and the data payload of the FCP_DATA sequence can fit into three or fewer data buffers. The data structure shown in FIG. 12 are similar to those shown in FIG. 11 with the exception that, rather than having extended SGL pages (1110 and 1112 in FIG. 11) external from the IWE (1102 in FIG. 11), the IWE 1202 in FIG. 12 includes a local SGL 1204 that is included within the IWE 1202. Otherwise, the operations carried out by the TL in response to the incrementing of the ERQ producer index by the host are analogous to those carried out for the FCP write operation described above with reference to FIG. 11.

Figure 13:
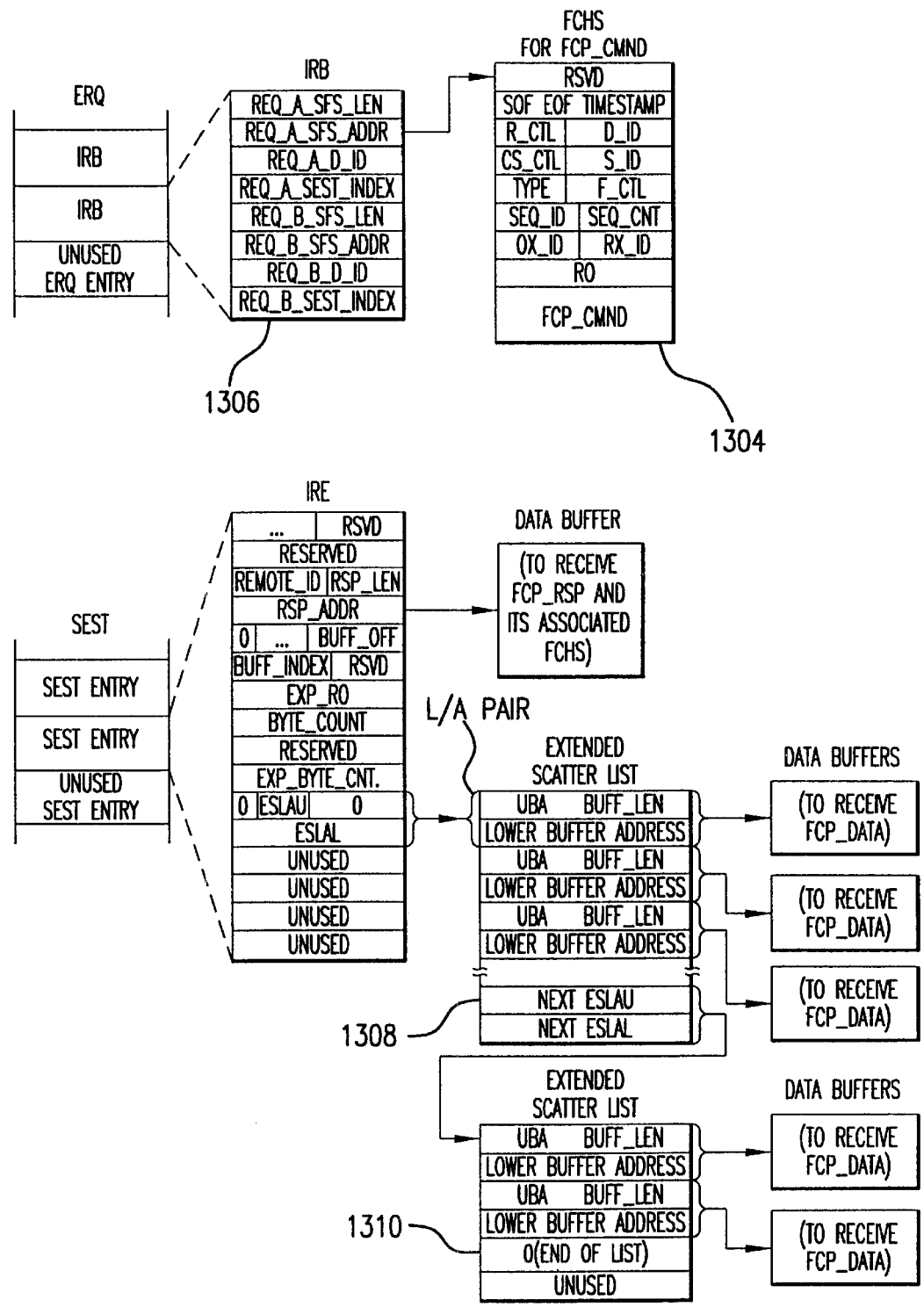
FIG. 13 shows the host memory data structures used to perform an initiated FC Protocol for SCSI read operation to more than three data buffers.

FIG. 13 shows the host memory data structures used to perform an FCP read operation where the FC node in which the TL resides is the initiator of the read operation and the data to be read will fill more than three data buffers. These data structures are similar to those shown in FIG. 11, with the following exceptions: (1) rather than an IWE (1102 in FIG. 11), the SEST entry created by the host contains an initiator read entry ("IRE"); (2) there is no FCHS for the FCP_DATA sequence (1106 in FIG. 11); and (3) the FCHS for the FCP CMND sequence 1304 associated with the IRB 1306 contains a read command, rather than a write command as in the case of the FCHS (1122 in FIG. 11) for the write operation. As with the write operation, the host updates the ERQ producer index in order to initiate the read operation, and the TL uses the information stored in the data structures in FIG. 13 to conduct the FCP_CMND sequence and the FCP_DATA sequences, and receives the FCP_RSP sequence from the target SCSI device at the conclusion of the read operation.

Figure 14:
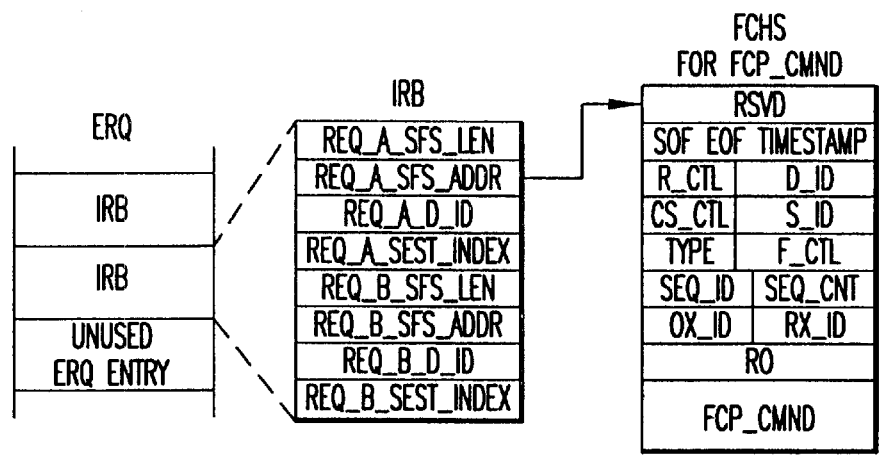
FIG. 14 shows the data structures required to perform an initiated FC Protocol for SCSI read operation to three or fewer data buffers.
Figure 14:
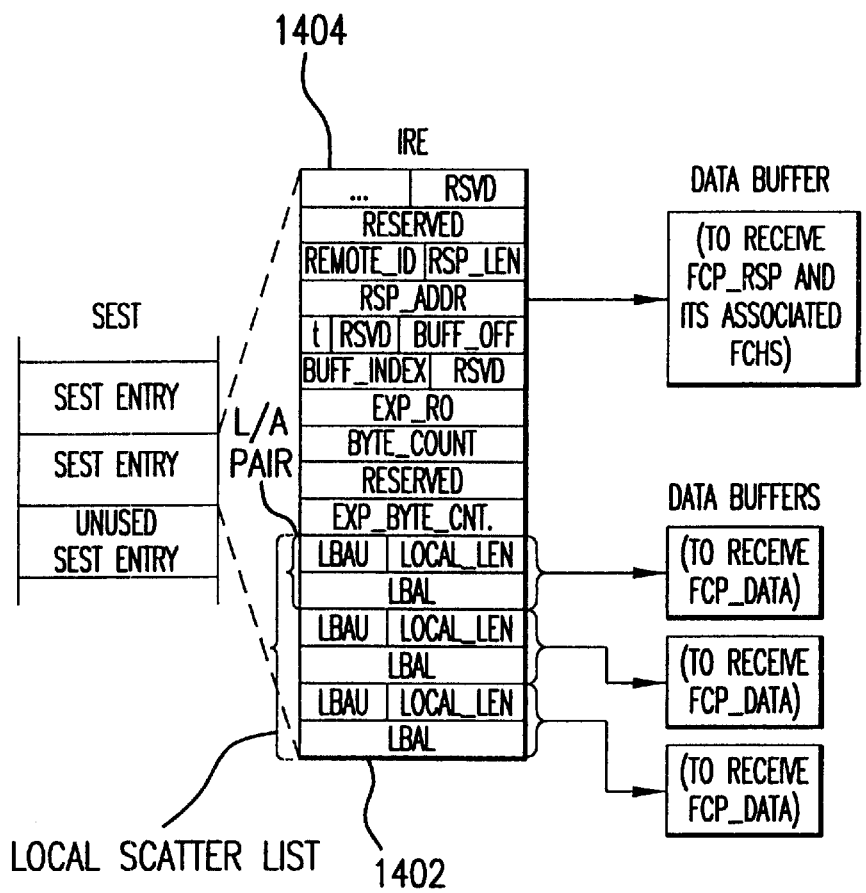

FIG. 14 shows the data structures required to perform the FCP read operation where the FC node in which the TL resides is the initiator of the operation and where the data to be received can fit into three or fewer data buffers. FIG. 14 bears the same relationship to FIG. 13 as FIG. 12 bears to FIG. 11. Instead of the external extended FCL pages (1308 and 1310 in FIG. 13), a local SGL 1402 is included within the IRE 1404. Otherwise, the operations conducted by the TL in order to complete the FCP read operation are identical with those discussed with reference to FIG. 13.

Figure 15:
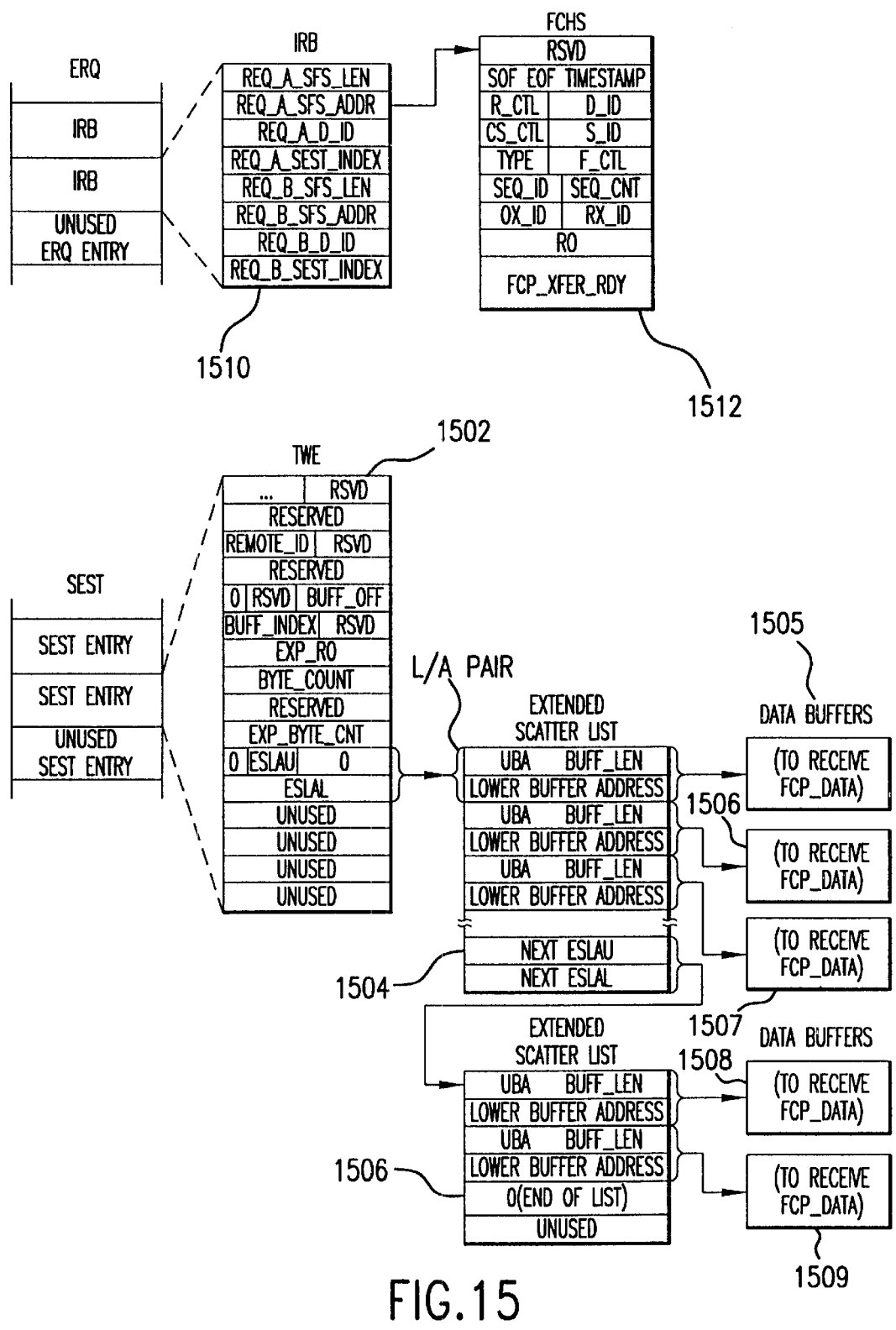
FIG. 15 shows the host memory data structures required for an FC node that is the target of an FC Protocol for a SCSI write operation initiated by another FC node to more than three data buffers.

FIG. 15 shows the host memory data structures required for an FC node that is the target of a FCP write operation initiated by another FC node to carry out the indicated FCP write operation at the FC target node. When the TL in the FCP target node receives a FCP_CMND frame from the FC initiator node, the TL places it into the SFQ (903 in FIG. 9) and notifies the host via an inbound completion message. Upon receiving the inbound completion message, the host allocates and fills in the data structures shown in FIG. 13. These include the target write entry ("TWE") 1502 which is associated with one or more external extended SGL pages 1506 and 1506. These external extended SGL pages are, in turn, associated with data buffers 1505-1509 in which the data transferred from the FC initiator node will be placed after being extracted from the FCP DATA sequence. The host also creates an IRB 1510 associated with an FCHS 1512 for the FCP_XFER_RDY sequence that will be transmitted back to the FC initiator node in order to elicit the FCP_DATA sequence. The host initiates sending of the FCP XFER_RDY sequence and subsequent reception of the write data by updating the ERQ producer index register.

Figure 16:
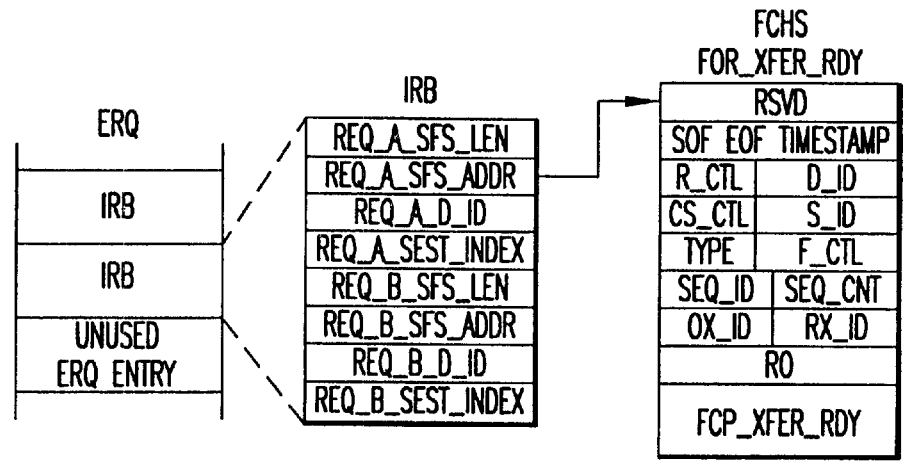
FIG. 16. shows the host memory data structures required for an FC node that is the target of an FC Protocol for a SCSI write operation initiated by another FC node to three or fewer data buffers.
Figure 16:
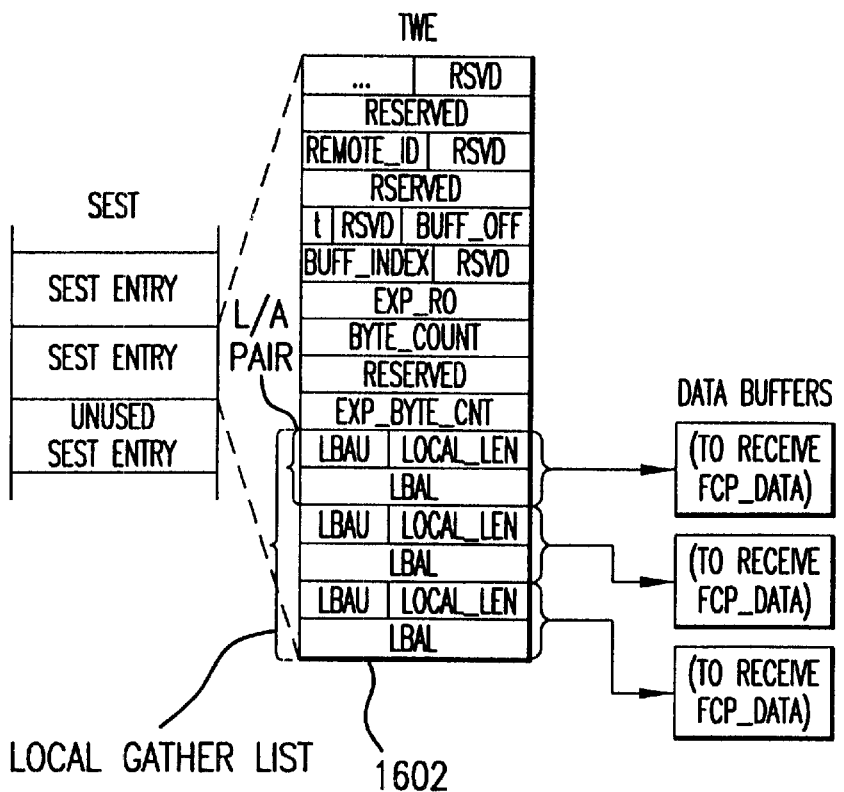

FIG. 16 bears the same relationship to FIG. 15 as FIG. 12 bears to FIG. 11 and FIG. 14 bears to FIG. 13 showing the host memory structures for a targeted FCP write operation employing a SGL. The only essential difference between FIGS. 15 and 16 are that the external extended SGL pages (1504 and 1506 in FIG. 15) are replaced by a local SGL 1602.

Figure 17:
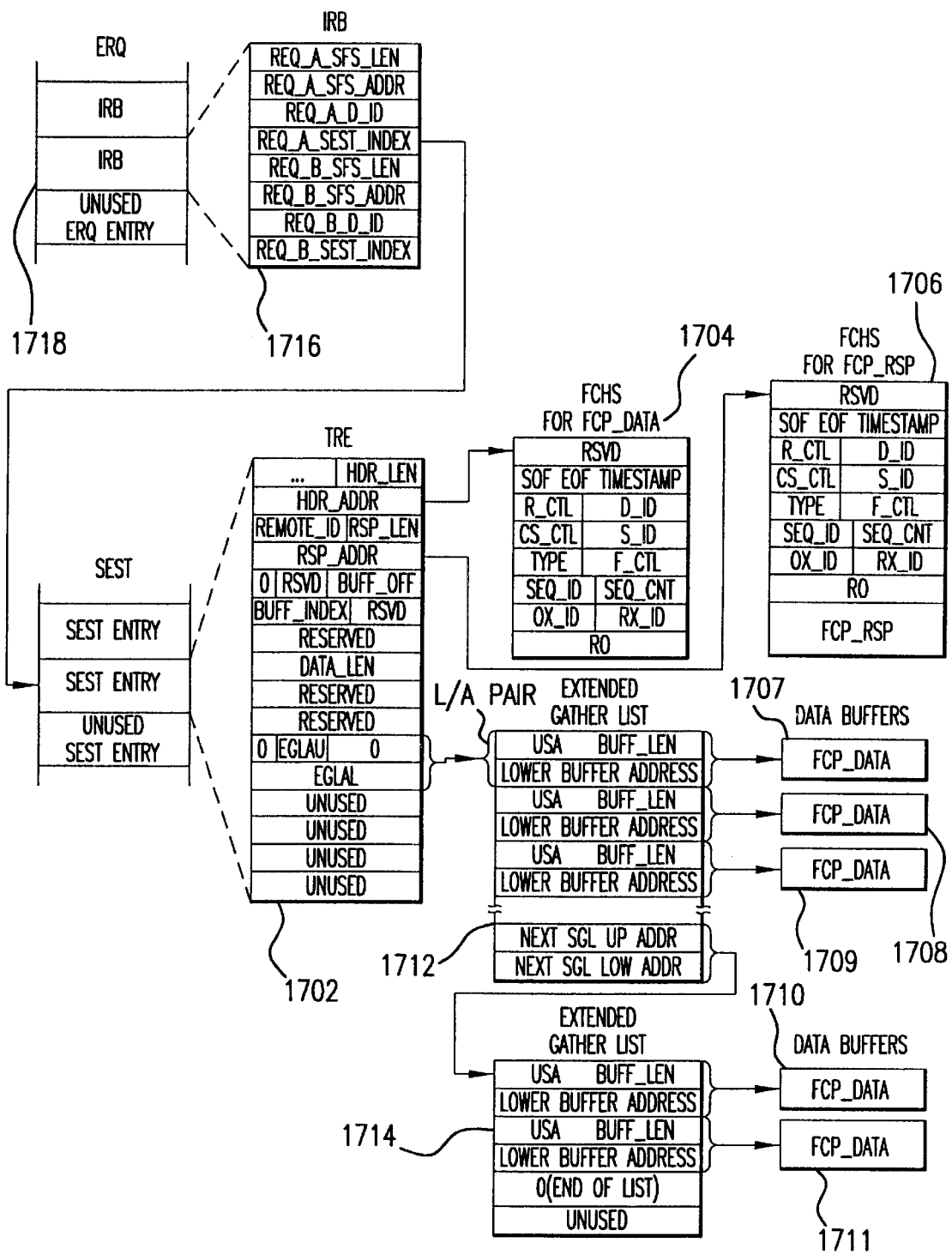
FIG. 17 shows the host memory data structures required for an FC target node to carry out a read operation initiated by an FC initiator node from more than three data buffers.

FIG. 17 shows the host memory data structures required for an FC target node to carry out a read operation initiated by an FC initiator node. These data structures are similar to the data structures required by an FC target node to respond to an FCP write operation, shown in FIG. 15, with the following exceptions: (1) there is no FCHS for a FCP_XFER_RDY operation (1512 in FIG. 15) since no FCP_XFER_RDY sequence is involved; (2) the TWE (1502 in FIG. 15) is replaced in FIG. 17 with a target read entry ("TRE") 1702; and (3) an FCHS for an FCP_DATA sequence 1704 and an FCHS for an FCP RSP sequence 1706 are both associated with the TRE 1702. When the TL receives an FCP_CMND frame from the FC initiator node, the TL places the FCP_CMND frame into the SFQ (903 in FIG. 9) and notifies the host via an inbound completion message. When the host is notified by the inbound completion message, it interprets the contents of the FCP_CMND frame and sets up the data structures in FIG. 17 in order to respond to the SCSI read command represented by the FCP_CMND frame. The host creates in an unused SEST entry a TRE 1702 data structure and associates with the TRE 1702 the FCHS for the FCP_DATA sequence 1704 and the FSHS for the FCP_RSP sequence 1706. The host also allocates a number of data buffers that the host fills via a SCSI read operation and that will be transferred in the subsequent FCP DATA sequence back to the FC initiator node. These data buffers 1707-1711 are referenced by one or more external extended SGL pages 1712 and 1714. The host also creates an IRB 1716 in an unused ERQ entry 1718. By updating the ERQ producer index, the host initiates the return of data solicited by the FCP read operation, mediated by the TL, resulting in sending by the FC target node the FCP_DATA sequences containing the data read from the SCSI device and a final FCP_RSP sequence indicating completion of the read command.

Figure 18:
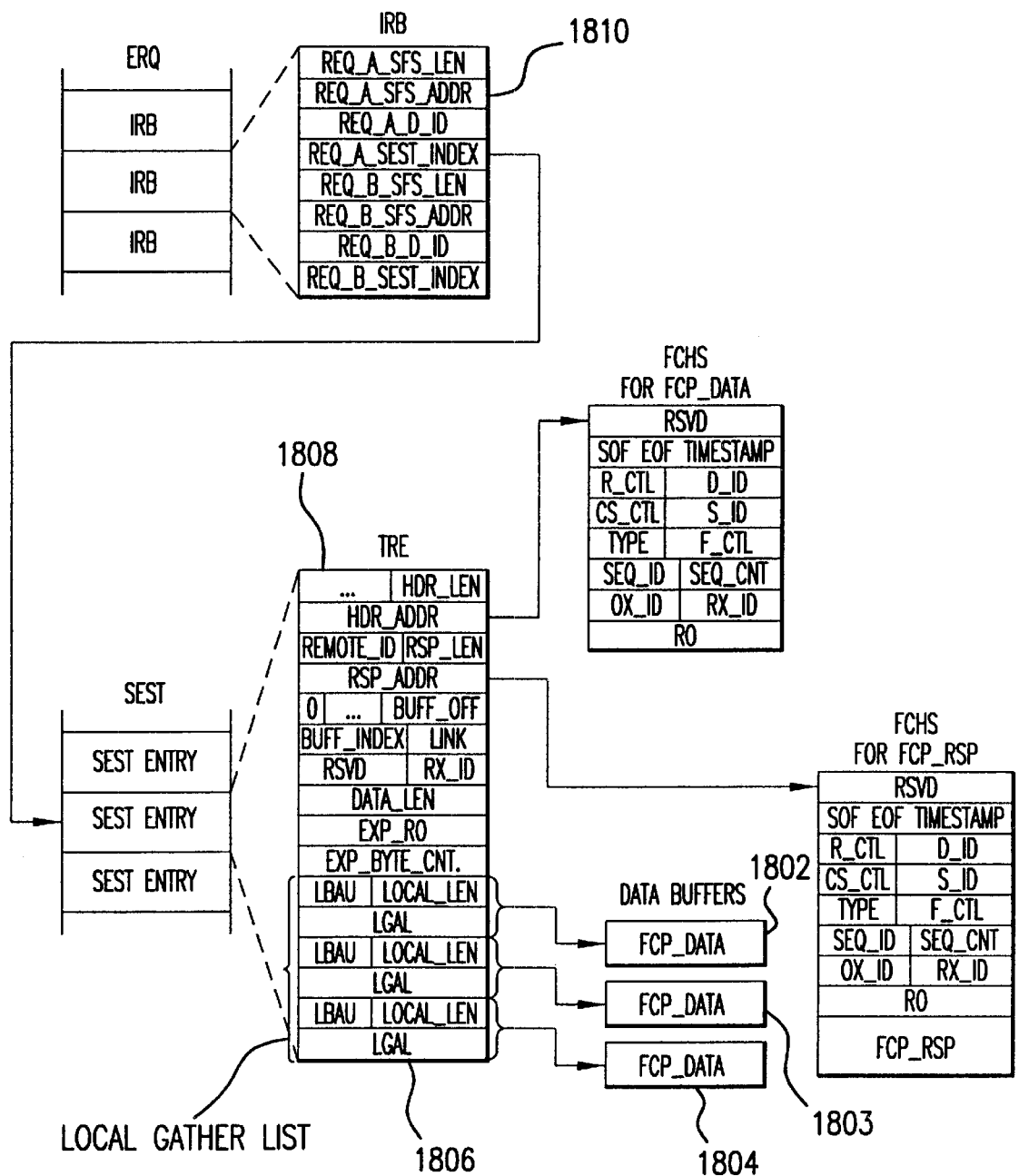
FIG. 18 shows the host memory data structures required for an FC target node to carry out a read operation initiated by an FC initiator node from three or less data buffers.

FIG. 18 bears the same relationship to FIG. 17 as FIGS. 12, 14 and 16 bear to FIGS. 11, 13 and 15, respectively. The operations carried out by the TL in order to respond to an FCP read request are the same as those discussed with reference to FIG. 17. The only difference in FIG. 18 is that the data buffers that contain the data read from the SCSI device 1802-1804 are referenced from a local SGL 1806 included within the TRE 1808.

Arbitrated Loop Initialization

As discussed above, the FC frame header contains fields that specify the source and destination fabric addresses of the FC frame. Both the D_ID and the S_ID are 3-byte quantities that specify a three-part fabric address for a particular FC port. These three parts include specification of an FC domain, an FC node address, and an FC port within the FC node. In an arbitrated loop topology, each of the 127 possible active nodes acquires, during loop initialization, an arbitrated loop physical address ("AL_PA"). The AL_PA is a 1-byte quantity that corresponds to the FC port specification within the D_ID and S_ID of the FC frame header. Because there are at most 127 active nodes interconnected by an arbitrated loop topology, the single byte AL_PA is sufficient to uniquely address each node within the arbitrated loop.

Figure 19:
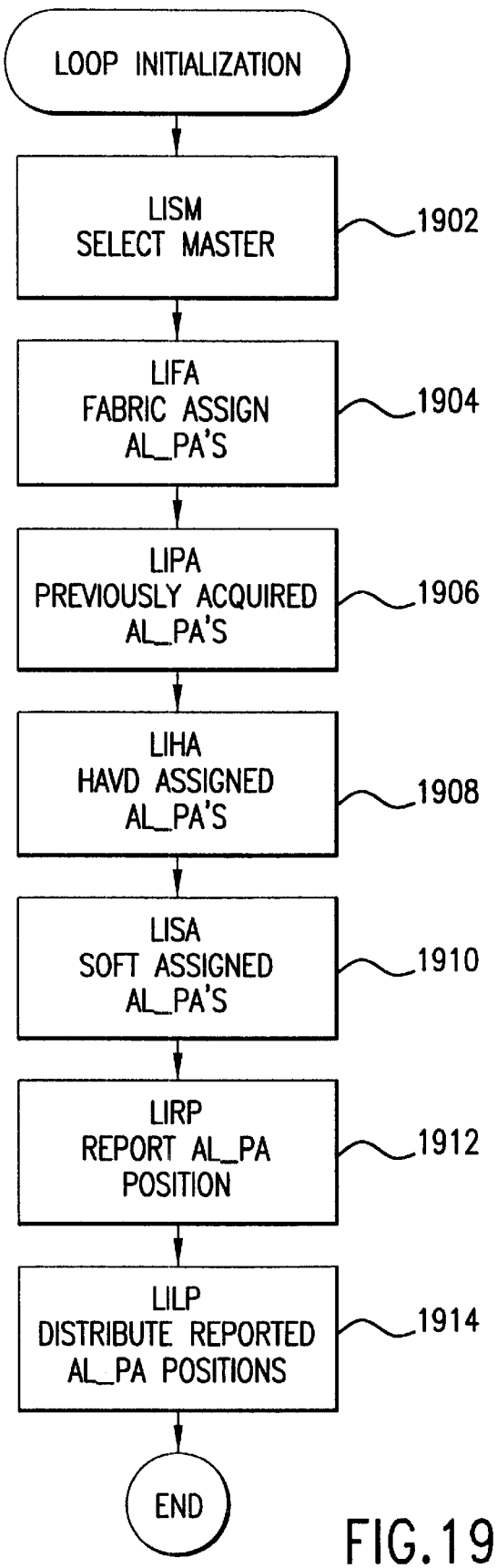
FIG. 19 shows a diagram of the seven phases of FC arbitrated loop initialization.
Figure 20:
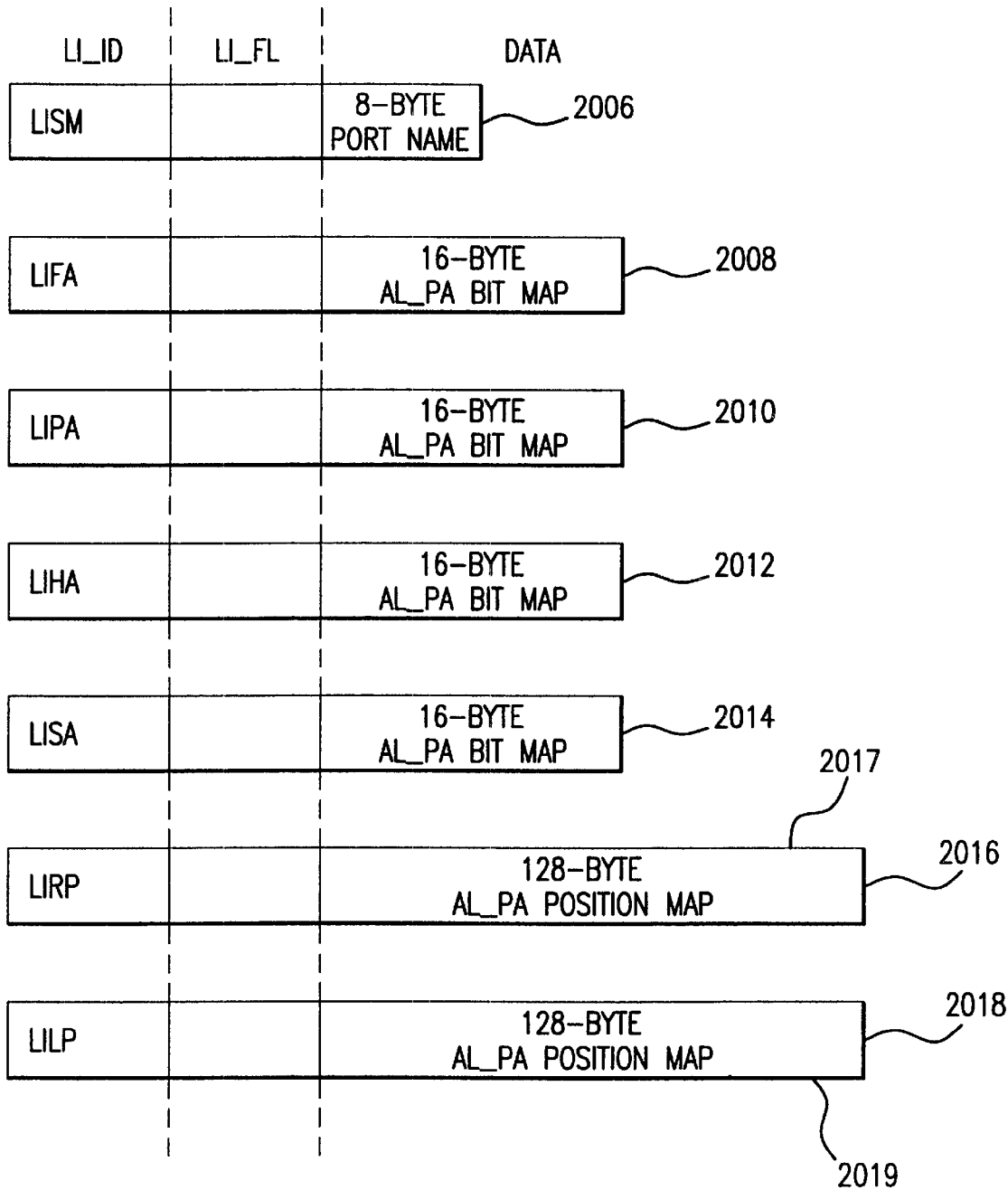
FIG. 20 shows the data payload of FC frames transmitted by FC nodes in an arbitrated loop topology during each of the seven phases of loop initialization shown in FIG. 19.

The loop initialization process may be undertaken by a node connected to an arbitrated loop topology for any of a variety of different reasons, including loop initialization following a power reset of the node, initialization upon start up of the first node of the arbitrated loop, subsequent inclusion of an FC node into an already operating arbitrated loop, and various error recovery operations. FC arbitrated loop initialization comprises seven distinct phases. FIG. 19 shows a diagram of the seven phases of FC arbitrated loop initialization. FIG. 20 shows the data payload of FC frames transmitted by FC nodes in an arbitrated loop topology during each of the seven phases of loop initialization shown in FIG. 19. The data payload for the FC frames used in each of the different phases of loop initialization comprises three different fields, shown as columns 2002–2004 in FIG. 20. The first field 2002 within each of the different data payload structures is the LI_ID field. The LI_ID field contains an 16-bit code corresponding to one of the seven phases of group initialization. The LI_FL field 2003 for each of the different data payload layouts shown in FIG. 20 contains various flags, including flags that specify whether the final two phases of loop initialization are supported by a particular FC port. The TL supports all seven phases of loop initialization. Finally, the data portion of the data payload of each of the data payload layouts 2004 contains data fields of varying lengths specific to each of the seven phases of loop initialization. In the following discussion, the seven phases of loop initialization will be described with references to both FIGS. 19 and 20.

In the first phase of loop initialization 1902, called "LISM," a loop initialization master is selected. This first phase of loop initialization follows flooding of the loop with loop initialization primitives ("LIPs"). All active nodes transmit an LISM FC arbitrated loop initialization frame 2006 that includes the transmitting node's 8-byte port name. Each FC port participating in loop initialization continues to transmit LISM FC arbitrated loop initialization frames and continues to forward any received LISM FC arbitrated loop initialization frames to subsequent FC nodes in the arbitrated loop until either the FC port detects an FC frame transmitted by another FC port having a lower combined port address, where a combined port address comprises the D_ID, S_ID, and 8-byte port name, in which case the other FC port will become the loop initialization master ("LIM"), or until the FC port receives back an FC arbitrated loop initialization frame that that FC port originally transmitted, in which case the FC port becomes the LIM. Thus, in general, the node having the lowest combined address that is participating in the FC arbitrated loop initialization process becomes the LIM. By definition, an FL_PORT will have the lowest combined address and will become LIM. At each of the loop initialization phases, loop initialization may fail for a variety of different reasons, requiring the entire loop initialization process to be restarted.

Once an LIM has been selected, loop initialization proceeds to the LIFA phase 1904, in which any node having a fabric assigned AL_PA can attempt to acquire that AL_PA. The LIM transmits an FC arbitrated loop initialization frame having a data payload formatted according to the data payload layout 2008 in FIG. 20. The data field of this data layout contains a 16-byte AL_PA bit map. The LIM sets the bit within the bit map corresponding to its fabric assigned AL_PA, if the LIM has a fabric assigned AL_PA. As this FC frame circulates through each FC port within the arbitrated loop, each FC node also sets a bit in the bit map to indicate that FC nodes fabric-assigned AL_PA, if that node has a fabric assigned AL_PA. If the data in the bit map has already been set by another FC node in the arbitrated loop, then the FC node must attempt to acquire an AL_PA during one of three subsequent group initialization phases. The fabric assigned AL_PAs provide a means for AL_PAs to be specified by an FC node connected to the arbitrated loop via an FL_Port.

In the LIPA loop initialization phase 1906, the LIM transmits an FC frame containing a data payload formatted according to the data layout 2010 in FIG. 20. The data field contains the AL_PA bit map returned to the LIM during the previous LIPA phase of loop initialization. During the LIPA phase 2010, the LIM and other FC nodes in the arbitrated loop that have not yet acquired an AL_PA may attempt to set bits within the bit map corresponding to a previously acquired AL_PA saved within the memory of the FC nodes. If an FC node receives the LIPA FC frame and detects that the bit within the bit map corresponding to that node's previously acquired AL_PA has not been set, the FC node can set that bit and thereby acquire that AL_PA.

The next two phases of loop initialization, LIHA 1908 and LISA 1910 are analogous to the above-discussed LIPA phase 1906. Both the LIHA phase 1908 and the LISA phase 1910 employ FC frames with data payloads 2012 and 2014 similar to the data layout for the LIPA phase 2010 and LIFA phase 2008. The bit map from the previous phase is recirculated by the LIM in both the LIHA 1908 and LISA 1910 phases, so that any FC port in the arbitrated loop that has not yet acquired an AL_PA may attempt to acquire either a hard assigned AL_PA contained in the port's memory, or, at last resort, may obtain an arbitrary, or soft, AL_PA not yet acquired by any of the other FC ports in the arbitrated loop topology. If an FC port is not able to acquire an AL_PA at the completion of the LISA phase 1910, then that FC port may not participate in the arbitrated loop. The FC-AL-2 standard contains various provisions to enable a nonparticipating node to attempt to join the arbitrated loop, including restarting the loop initialization process.

In the LIRP phase of loop initialization 1912, the LIM transmits an FC frame containing a data payload having the data layout 2016 in FIG. 20. The data field 2017 of this data layout 2016 contains a 128-byte AL PA position map. The LIM places the LIM's acquired AL_PA, if the LIM has acquired an AL_PA, into the first AL_PA position within the AL_PA position map, following an AL_PA count byte at byte 0 in the data field 2017, and each successive FC node that receives and retransmits the LIRP FC arbitrated loop initialization frame places that FC node's AL_PA in successive positions within the AL PA position map. In the final loop initialization phase LILP 1914, the AL_PA position map is recirculated by the LIM through each FC port in the arbitrated loop technology so that the FC ports can acquire, and save in memory, the completed AL_PA position map. This AL_PA position map allows each FC port within the arbitrated loop to determine its position relative to the other FC ports within the arbitrated loop.

The Client/Server Data Transfer Protocols of the Present Invention

Figure 21:
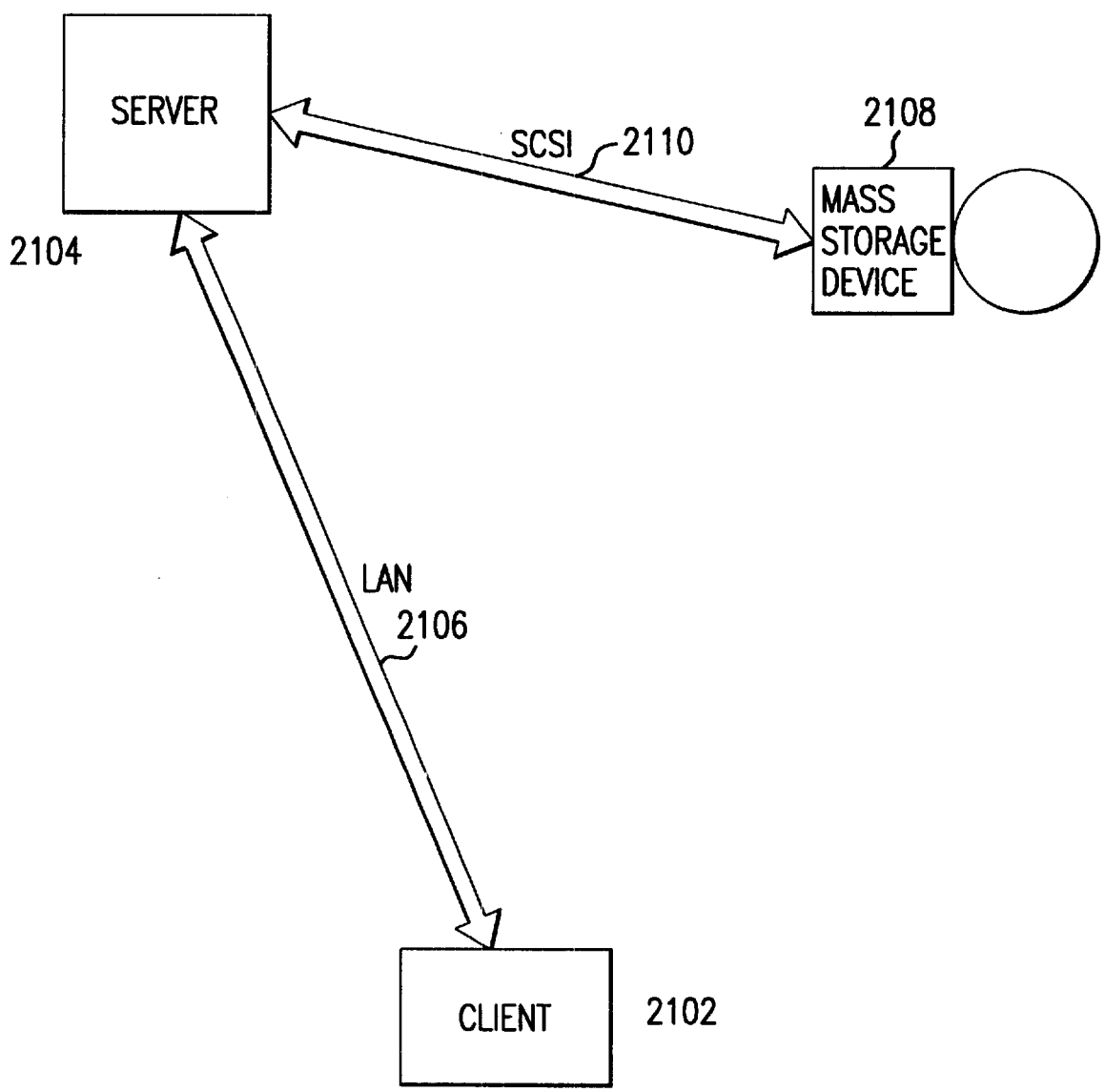
FIG. 21 illustrates the communications network environment in which many common currently available and previously available client server architectures are implemented.

FIG. 21 illustrates the communications network environment in which many common currently-available and previously-available client server architectures are implemented. A client computer 2102 exchanges commands, data, and status messages with a server computer 2104 via a LAN 2106, such as anether net. The server computer 2104 exchanges commands, data, and status messages with a mass storage device 2108 via a local bus, such as a SCSI bus 2110.

Figure 22:
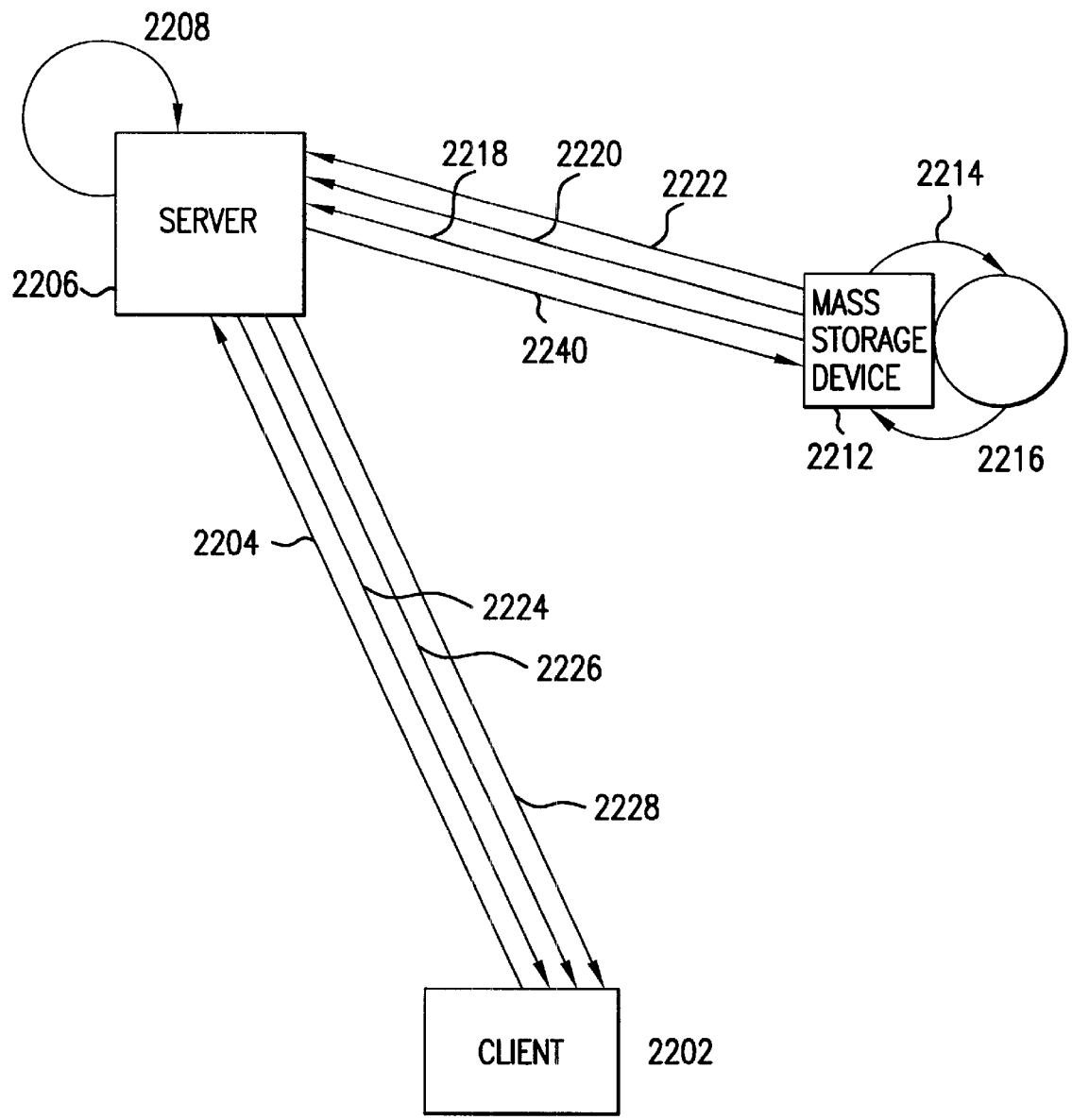
FIG. 22 illustrates a read operation issued by a client computer and executed on behalf of the client computer by a server computer and a mass storage device in a LAN/SCSI-based communications network.

FIG. 22 illustrates a read operation issued by a client computer and executed on behalf of the client computer by a server computer and a mass storage device in a LAN/SCSI-based communications network. The client computer 2202 first sends a read command 2204 to the server computer 2206. The server computer determines whether the read command is authorized, and, if authorized, maps the target of the read command to a particular mass storage device 2208. Note that the authorization and mapping function of the server provide great security and topological flexibility in a way that does not complicate operation of the client computer. Maintaining the authorization and target mapping functionalities is desirable when porting client/server architectures to new communications networks such as the FC.

Once the server has finished authorization and mapping, and assuming that the read operation is authorized and that the client specified valid data for reading, the server 2206 sends a read command 2210 to the mass storage device 2212. The mass storage device issues an internal command or commands 2214 to retrieve the data and receives the data 2216 from the data storage medium. Then, the mass storage device sends the data 2218 and 2220 to the server 2206. Once the data has been transferred, the mass storage device sends a final status message 2222 to the server computer 2206 to indicate whether or not the read has been successfully executed. Assuming that the read has been successfully executed, the server then sends the requested data 2224–2226 to the client computer 2202, and finally sends the status message 2228 to the client computer to complete execution of the read operation. In the communications network of FIG. 21, the server computer 2104 has three main functions: (1) a store-and-forward bridge between the LAN 2106 and the SCSI bus 2110; (2) a security controller for controlling access by client computers, such as client computer 2102, to data stored on mass storage devices such as mass storage device 2108; and (3) a mapping device for translating client data specifications into data locations within particular mass storage devices.

Figure 23:
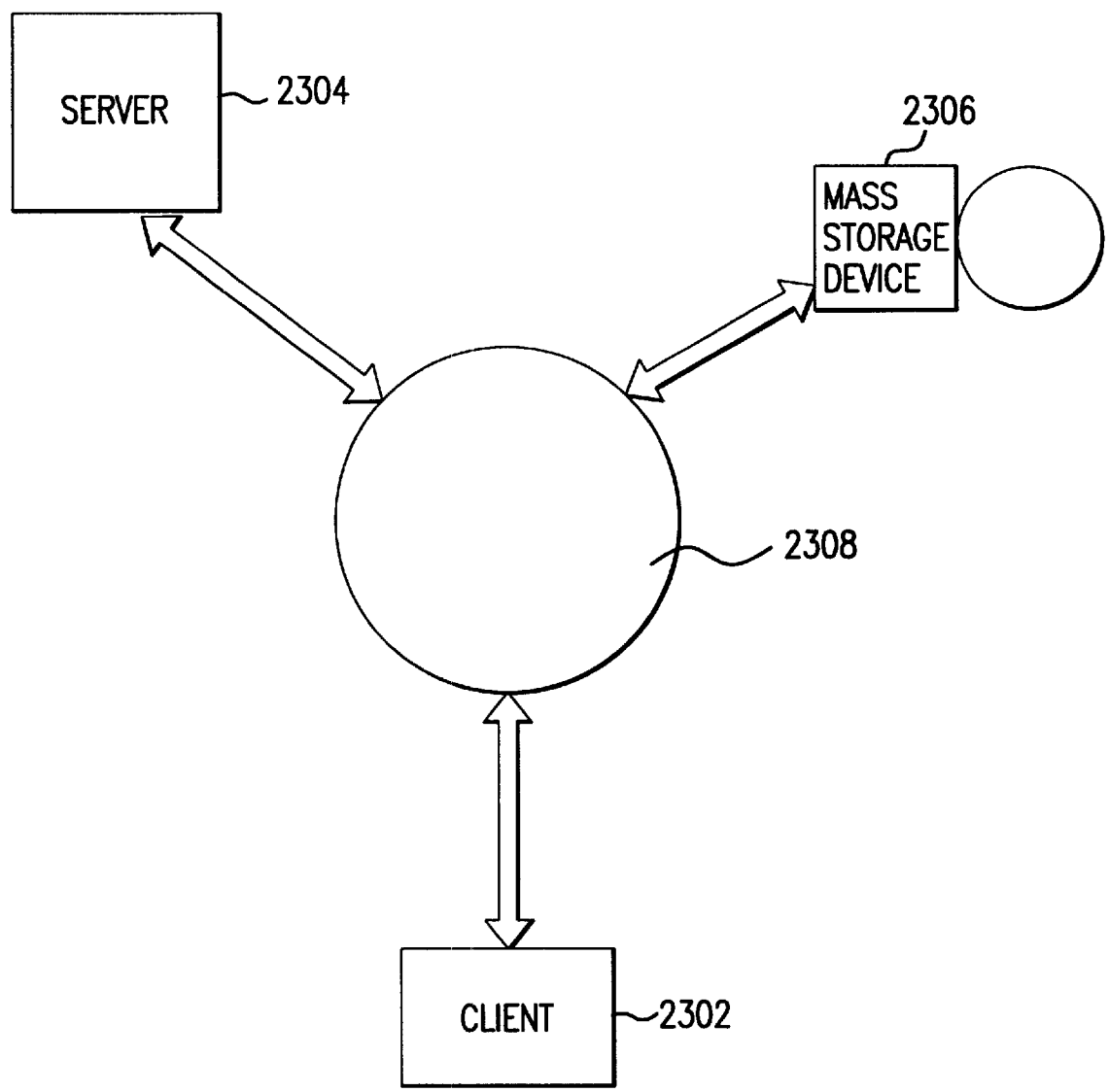
FIG. 23 illustrates a client/server architecture implemented on top of the fibre channel.

FIG. 23 illustrates a client/server architecture implemented on top of the FC. The client computer 2302, the server computer 2304, and a mass storage device 2306 are all interconnected via an FC fabric or FC arbitrated loop 2308. The FC eliminates the need for a network bridging function within the server computer 2304. The mass storage device 2306 and client computer 2302 are directly interconnected by the FC fabric or FC arbitrated loop 2308. However, the security and mapping functions of the server computer 2304 are as desirable in an FC-based client/server architecture as they are in the LAN/SCSI-based client/server architecture of FIG. 21.

Figure 24:
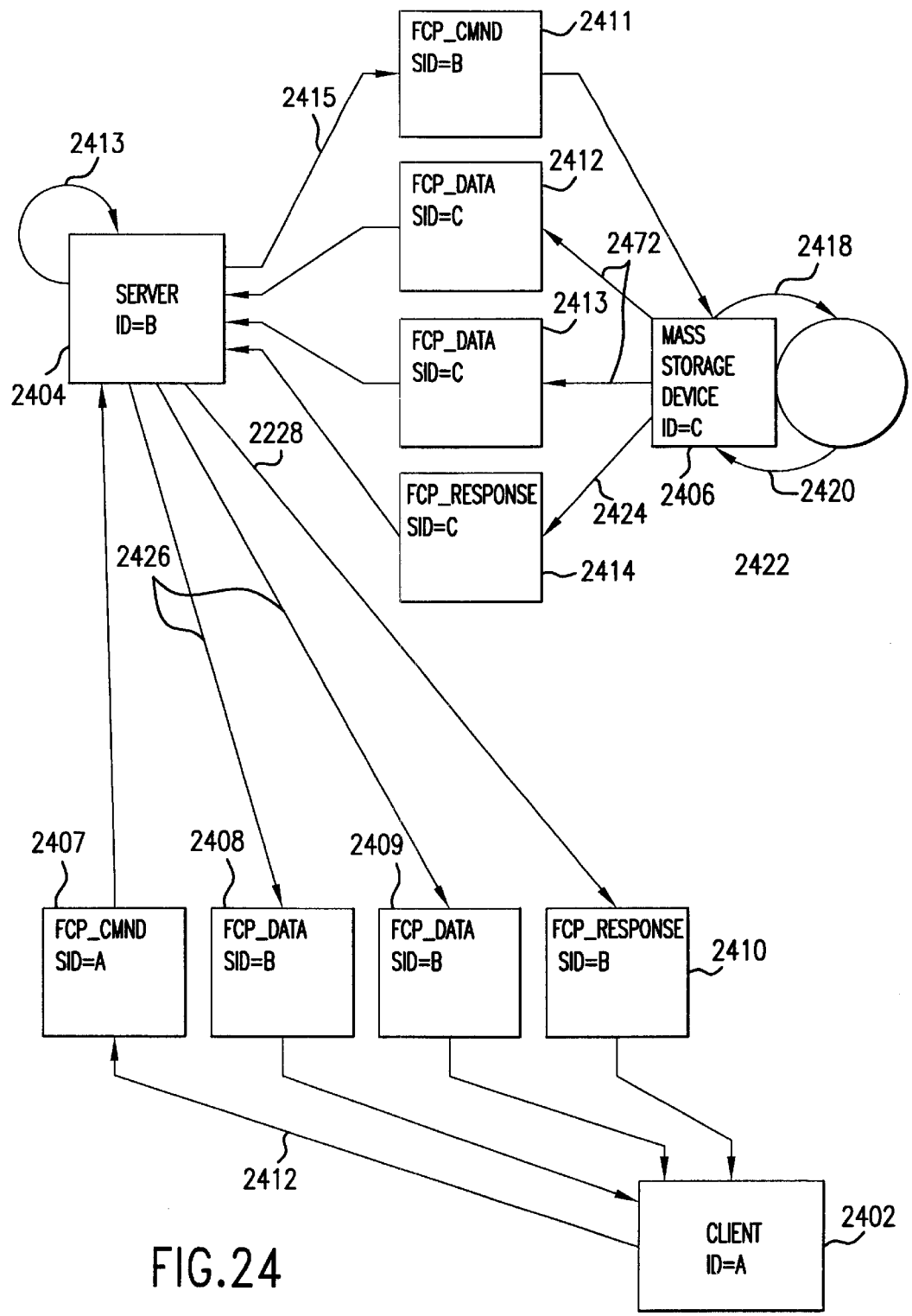
FIG. 24 illustrates implementation of a read operation according to currently-available client/server protocols mapped onto the fibre channel.

Unfortunately, the elimination of a need for the bridging function within the server by the FC is not currently taken advantage of by client/server protocols implemented on top of the FC. FIG. 24 illustrates implementation of a read operation according to currently-available client/server protocols mapped onto the FC. The client computer 2402 is shown in FIG. 24 with ID equal to (A,) or, in other words, having the fibre channel address "A." Similarly, the server computer 2404 has ID equal to "B," and the mass storage device 2406 has ID equal to "C." The read command, data, and a status message are exchanged between the client computer 2402, the server computer 2404, and the mass storage device 2406 within a set of single-frame and possibly multi-frame FCP sequences 2407–2414. In FIG. 24, each FCP sequence or FC frame contains an identification of the FC sequence type as well as the S_ID of the FC node (the client computer 2402, the server computer 2404, or mass storage device 2406) that sends the FCP sequence. For example, FCP sequence 2407 is an FCP_CMND with SJID equal to "A." These illustration conventions will also be used in FIGS. 25–26.

The client computer 2402 first issues an FCP CMND sequence 2412 to the server computer 2404. The server computer then conducts authorization and mapping functions 2413 and issues an FCP_CMND sequence 2415 to the mass storage device 2406. Note that the S_ID in the first FCP_CMND sequence 2407 is that of the client computer 2402 while the S_ID in the second FCP_CMND sequence 2411 is that of the server computer 2404. The mass storage device 2406 then issues an internal command 2418 in order to receive the data specified in the read command 2420 from the mass storage medium. Then, the mass storage device issues the first FCP_DATA sequence frame 2422 to the server computer 2404. Note that, in FIG. 24, the FCP_DATA sequence is shown as 2 FCP_DATA sequence frames 2412 and 2413 to represent the fact that an FCP_DATA sequence may be composed of multiple FCP_DATA sequence frames. Finally, the mass storage device 2406 issues an FCP_RESPONSE frame 2424 to the server computer 2404, thus completing the read command from the standpoint of the mass storage device. The server computer then forwards the data requested in the read command and received from the mass storage device to the client computer in an FCP_DATA sequence 2426, again represented in FIG. 24 by multiple FCP_DATA sequence frames, and finally sends to the client computer 2402 the FCP_RESPONSE 2428. From the standpoint of the client computer, the FCP_COMMAND sequence 2407 is directed to the server computer 2404, and all FCP_DATA sequence frames and the FCP_RESPONSE sequence are returned to the client computer 2402 from the server computer 2404. The client computer receives FCP_DATA sequence frames and the FCP_RESPONSE sequence with S_IDs equal to "B." Thus, the server computer continues to serve in a store and forward capacity in the client/server architecture, even though the client computer 2402 and the mass storage device 2418 are directly interconnected by the FC, as shown in FIG. 23. During the execution of the read command as illustrated in FIG. 24, transmission of the two FCP DATA sequence frames 24–26 and of the FCP_RESPONSE sequence 2328 is redundant. FCP_DATA sequence frames 2412 and 2413 and FCP_RESPONSE sequence 2414 could have been directly sent from the mass storage device 2406 to the client computer 2402. However, currently-available and previously-available FC ports are not implemented with support for a client/server protocol in which data is sent directly between the requesting client computer 2402 and the mass storage device 2418.

Figure 25:
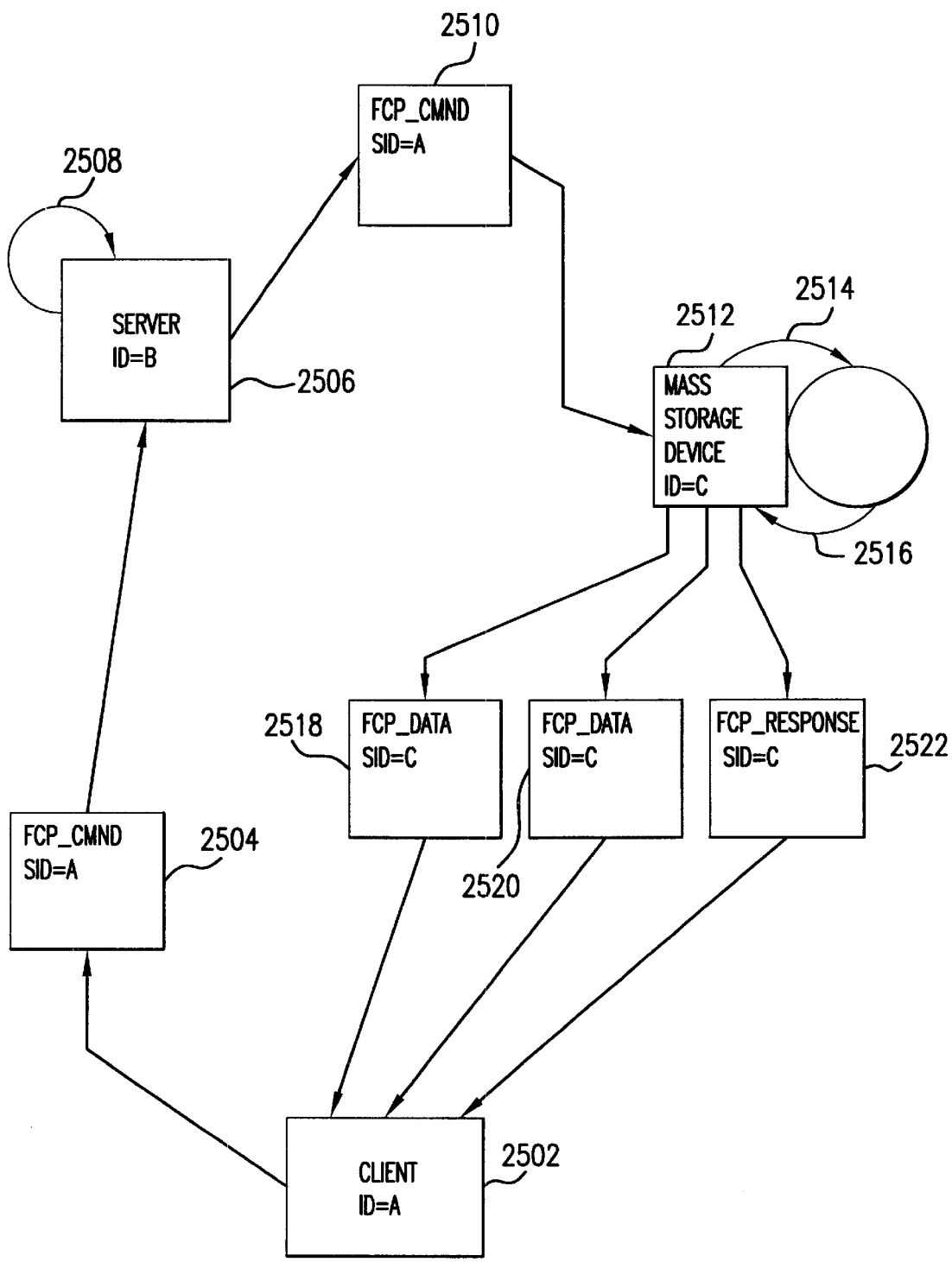
FIG. 25 illustrates execution of a read operation by the method of the present invention.
Figure 26:
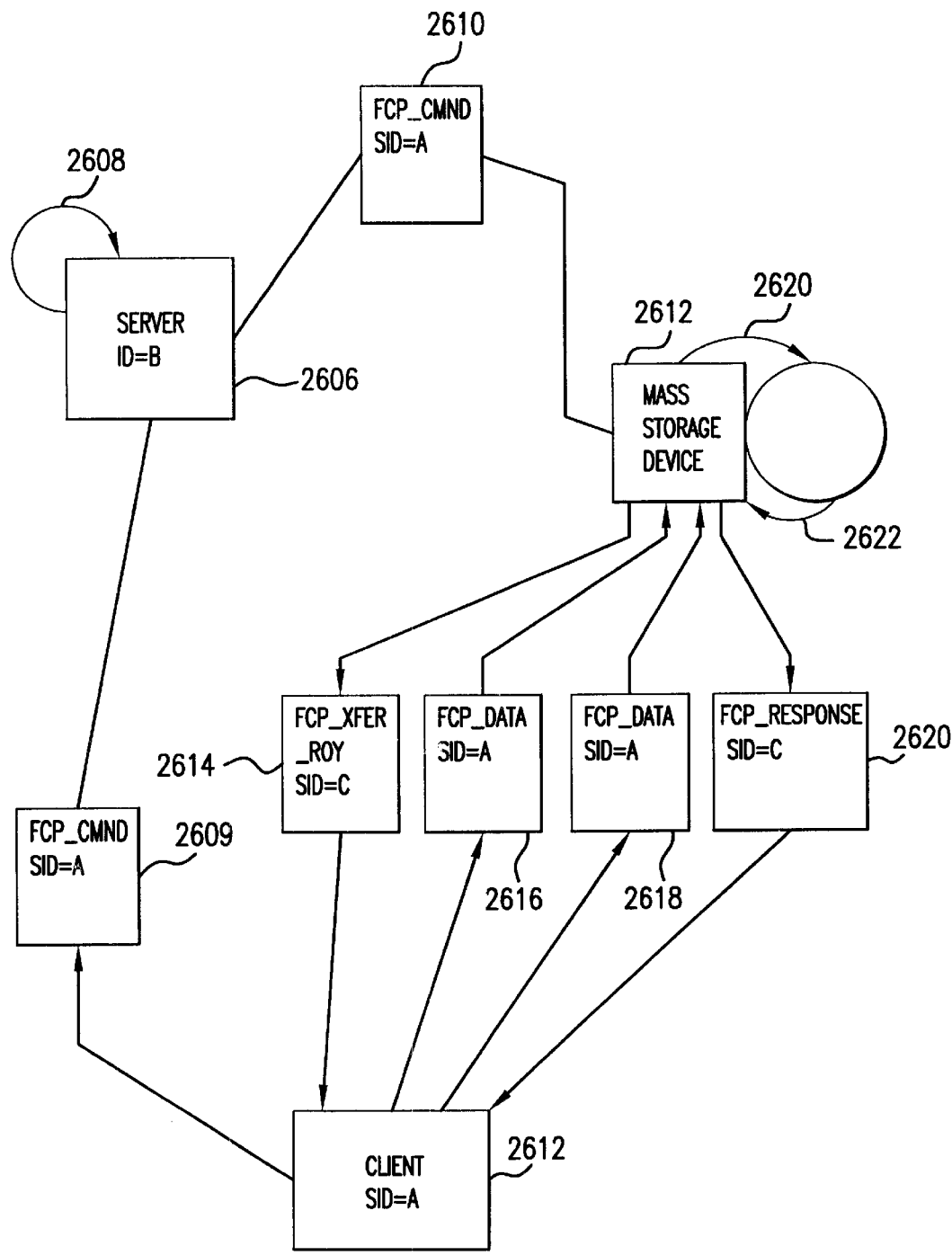
FIG. 26 illustrates execution of a write command according to the client/server protocol of the present invention.

FIGS. 25–26 illustrate an efficient client/server protocol implemented on top of the FC according to the method of the present invention. FIG. 25 illustrates execution of a read operation by the method of the present invention. First, the client computer 2502 sends an FCP_CMND sequence 2504 to the server computer 2506. As in FIG. 24, the S_ID of the FCP_CMND sequence is "A," the S_ID of the client computer 2502. Next, the server computer conducts its authorization and mapping functions 2508. Assuming that the read operation is authorized and the client has specified valid data for reading, the server computer sends an FCP_CMND sequence 2510 to the mass storage device. Note, however, that the S_ID in this second FCP_CMND sequence 2510 is also "A," the S_ID of the client computer. This is in contrast to the protocol illustrated in FIG. 24, in which the second FCP_CMND sequence 2411 contains the S_ID of the server computer 2404. This ability of the server computer 2506 to forward the FCP_CMND command 2510 with the client's S_ID is implemented, in hardware, within the TL. The mass storage device 2512 issues an internal read command 2514 and receives the requested data 2516 from the mass storage medium. Now, because the mass storage device has received the S_ID of the client computer 2502 rather than the server computer 2506, the mass storage device can send the FCP_DATA sequence composed of FCP_DATA frames 2518 and 2520 directly back to the client computer 2502. Finally, the mass storage device 2512 sends the FCP RESPONSE sequence 2522 back to the client computer 2502 to complete execution of the read command. Another feature of the TL allows the client computer 2502 to accept the FCP_DATA frames 2518 and 2520 and FCP_RESPONSE sequence 2522 directly back from the mass storage device 2512 despite having issued the FCP_CMND command 2504 to the server computer 2506. In other words, the D_ID of the FCP_CMND sequence 2504 does not match the S_ID of the returned FCP_DATA sequence frames 2518 and 2520 and the FCP_RESPONSE sequence 2522. Normally, these FC frames without matching S_IDs would be marked as bad frames and would not be process correctly within an FC interface controller. However, the TL supports copying of the S_ID and the first received FCP_DATA frame 2518 into an internal data structure, either the IRE or TWE discussed above with reference to FIGS. 11–14, so that the TL can match subsequent FCP_DATA frames 2520 and the FCP_RESPONSE sequence 2522 to the copied S_ID in the IRE or TWE.

FIG. 26 illustrates execution of a write command according to a client/server protocol of the present invention. The client computer 2602 sends an FCP_CMND sequence 2604 to the server computer 2606. The server computer conducts the authorization and mapping functions 2608 and then forwards the FCP_CMND 2610 to the mass storage device 2612. The mass storage device 2612 then sends an FCP_XFER_RDY sequence 2614 directly to the client computer 2602. The client computer copies the S_ID of the FCP_XFER_RDY sequence 2614 into an internal data structure so that subsequent FCP sequences received from the mass storage device can be matched to the write command, and so that FCP_DATA sequences can be addressed to the mass storage device. Upon receiving the FCP_XFER_RDY sequence 2614, the client computer sends an FCP_DATA sequence composed of FCP_DATA frames 2616 and 2618 to the mass storage device 2612 which issues, in each case, an internal command 2620 that stores the data onto the mass storage medium, each time receiving a completion status 2622 upon completion of the write command to the mass storage medium. Finally, the mass storage device, upon receiving all of the data from the client computer 2602, sends an FCP_RESPONSE sequence 2624 to the client computer 2602 to complete execution of the write command. The same TL functionality that supports the read operation of client/server protocol shown in FIG. 25, also supports the write operation of the client/server protocol, shown in FIG. 26. Thus the unnecessary transfer of data between the client and the server, in the case of a write command, and between the mass storage device and the server in case of a read command, are avoided in the client/server protocol of the present invention. Moreover, the server computer, under the client/server protocol of the present invention, need not store and forward data. By eliminating unnecessary FC communications traffic, the throughput of the FC is greatly improved, and I/O latencies are significantly decreased. Removing the need for the server computer to store and forward data greatly improves the server computer's capacity for handling multiple simultaneous read and write transactions and decreases memory utilization within the server computer.

Hardware Support for the Client/Server Protocol of the Present Invention

Figure 27:
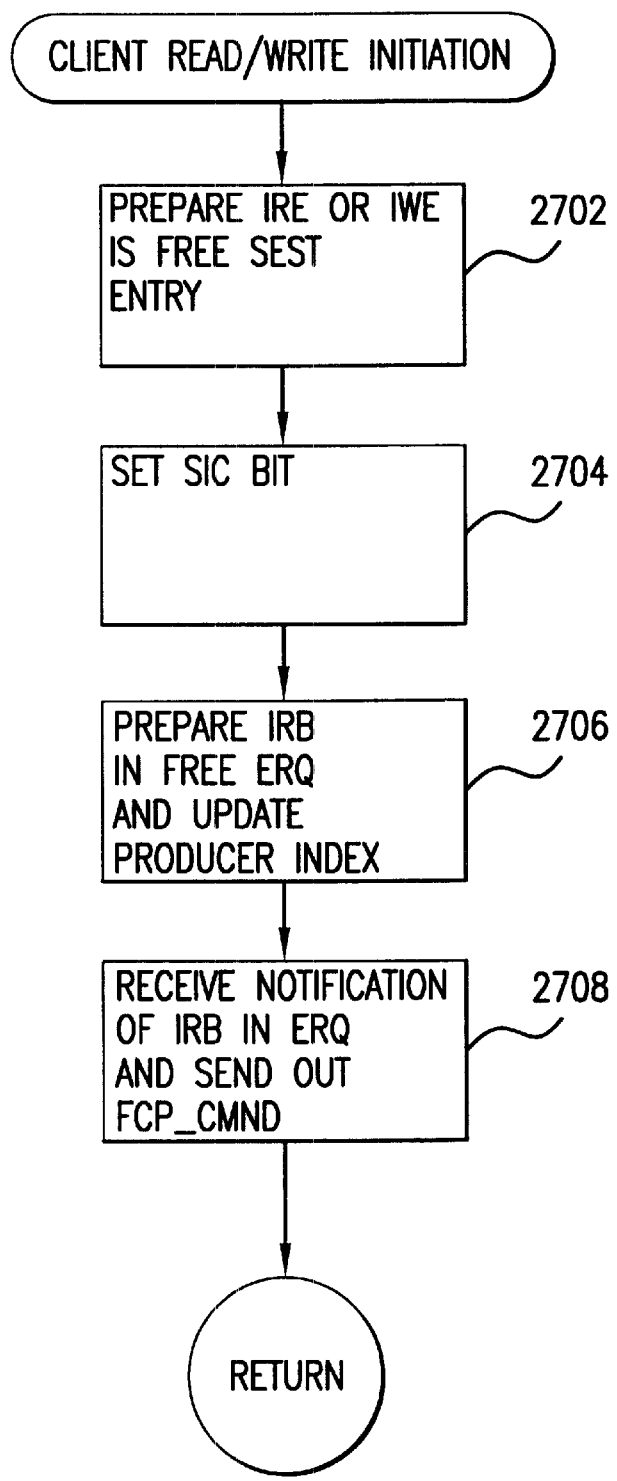
FIG. 27 illustrates the steps, conducted by a client, in order to issue the FCP_CMND sequence that initiates a read or write operation.
Figure 28:
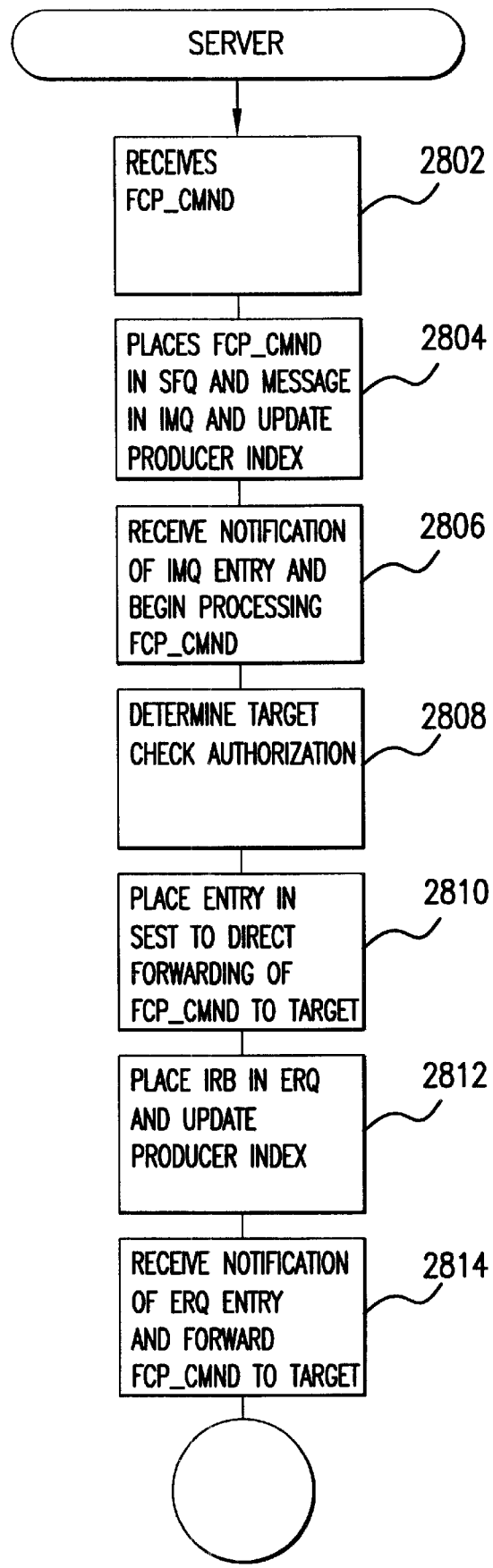
FIG. 28 illustrates the TACHYON TL support for the client/server protocol illustrated in FIGS. 25–26 for the server computer.
Figure 29:
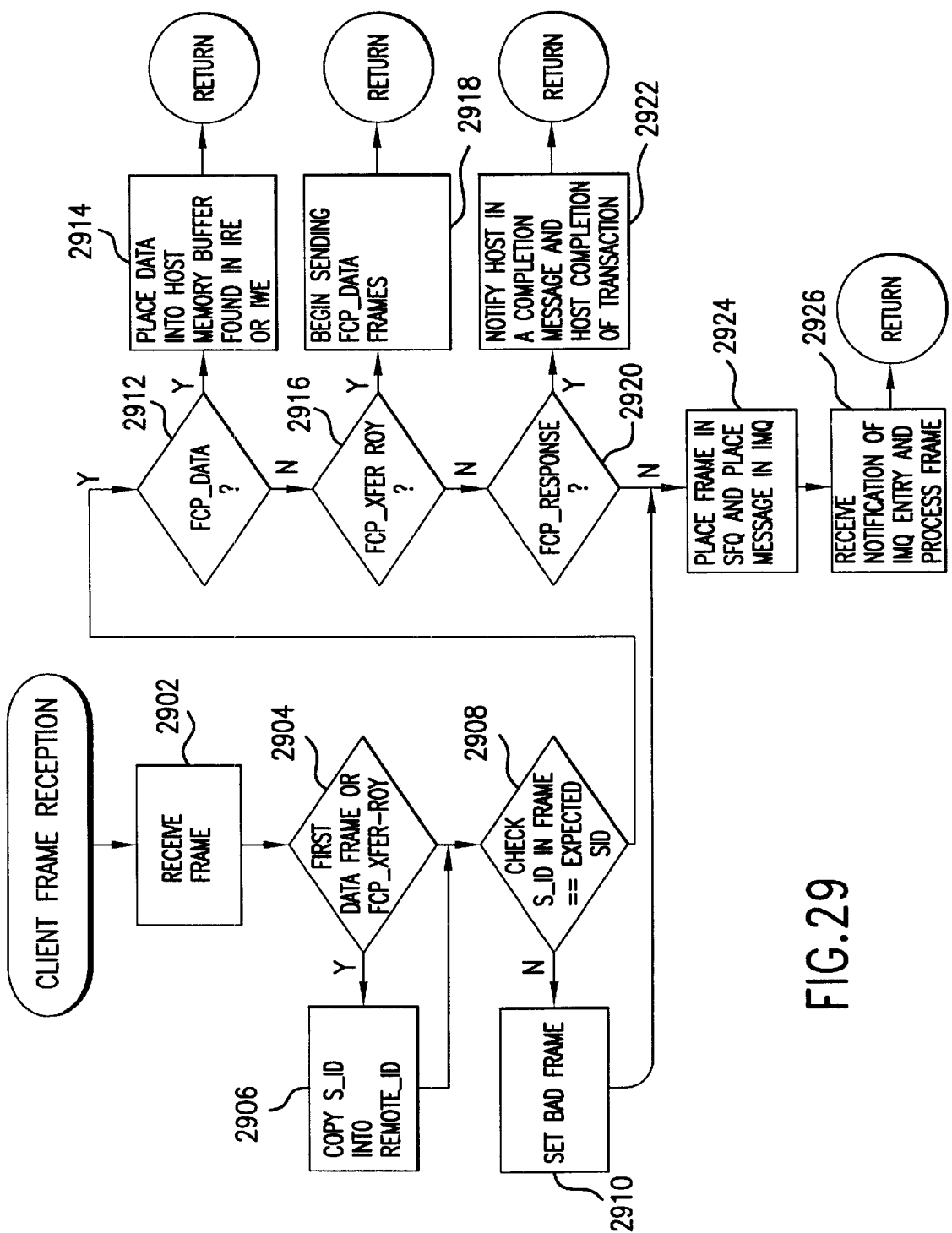
FIG. 29 illustrates the TACHYON TL support for client reception of FCP_DATA frames and FCP_XFER_RDY frames in order to implement the client/server protocol of FIG. 25–26.

FIGS. 27–29 are flow control diagrams that detail TL hardware support for the client/server protocol illustrated in FIGS. 25–26. FIG. 27 illustrates the steps, conducted by a client, in order to issue the FCP_CMND sequence that initiates a read or write operation. In step 2702, the host computer within an FC node prepares an IRE (1302 in FIG. 13 and 1402 in FIG. 14), in case of a read operation or an IWE (1102 in FIG. 11 and 1202 in FIG. 12), in case of a write operation, in a free slot within the SEST (904 in FIG. 9). Then, in step 2704, the host computer sets the S_ID Copy Enable bit ("SIC") in a TL control register (the TL configuration register) in order to direct the TL to copy the SJID of the first FC frame received from the target of the read or write operation into the Remote_ID field of the IRE or IWE (1124, 1206, 1312, and 1406 in FIGS. 11–14, respectively) prepared in step 2702. Next, in step 2706, the host computer prepares an IRB (1118 in FIG. 11) in a free ERQ (905 in FIG. 9) slot and updates the producer index of the ERQ in order to direct the TL to process the IRB and IRE or IWE. In step 2708, the TL receives notification of the IRB in the ERQ, processes the IRB, and sends out a corresponding FCP_CMND sequence. Thus, the setting of the SIC bit of the TL configuration register in step 2704 prepares the TL for the S_ID copying that allows the TL to accept an FCP_DATA frame or an FCP_XFER_RDY frame from a mass storage device despite the fact that the FCP_CMND sequence that elicited the FCP_DATA sequence frame or FCP_XFER_RDY frame was directed to a server computer, as discussed above with reference to FIG. 25–26.

FIG. 28 illustrates the TL support for the client/server protocol illustrated in FIGS. 25–26 related to the server computer. In step 2802, the TL within an FC port on the server computer receives the FCP_CMND from the client computer. In step 2804, the TL places the FCP_CMND sequence frame received in step 2802 into the SFQ (903 in FIG. 9), places a message in the IMQ (902 in FIG. 9) and updates the producer index of the IMQ in order to notify the host processor of the server computer that the FCP_CMND sequence has been received. In step 2806, the host processor of the server computer is notified of the message in the IMQ and begins processing the FCP_CMND command stored in the SFQ. In step 2808, the host processor of the server computer carries out its authorization and mapping functions, discussed above. In step 2810, the server computer places an entry into the SEST (904 in FIG. 9) to direct the TL to send an FCP_CMND sequence to the target mass storage device. As noted with reference to FIGS. 25–26, this entry must tell the TL to use the S_ID of the client rather than the S ID of the server, as the S_ID of the FCP_CMND command that is sent to the target mass storage device. The server accomplishes this either by placing an IWE into the SEST, or by using an IRE with a flag within a flags field (1314 in FIG. 13) set to tell the TL to use the client's S_ID.

In step 2812, the host processor of the server computer prepares an IRB (1306 in FIG. 13) in an empty slot of the ERQ (905 in FIG. 9) and updates the ERQ's producer index. Finally, in step 2814, the TL within an FC port of the server computer receives notification of the new IRB in the ERQ and processes the IRB and the corresponding SEST entry in order to send the FCP_CMND sequence to the target mass storage device.

FIG. 29 illustrates the TL support for client reception of FCP_DATA frames and FCP_XFER_RDY frames in order to implement the client/server protocol of FIGS. 25–26. In step 2902, the TL within an FC port of the client computer receives an FC frame having an exchange ID that matches the EXCHANGE_ID of the FCP_CMND sequence sent in step 2702 in FIG. 27. In step 2904, the TL determines whether the received frame is the first FC_DATA sequence frame returned in response to a read request or the FC_XFER_RDY sequence returned in response to a write request. If so, then, in step 2906, the TL copies the S_ID field contained in the received FC frame into the Remote_ID field of the IRE or IWE that corresponds to the FC exchange representing the read or write transaction. Next, in step 2908, the TL checks the S_ID of the received FC frame against the Remote_ID field of the IRE or IWE that corresponds to the FC exchange representing the I/O transaction. If the S_ID contained in the received frame does not match the Remote_ID field of the IRE or IWE, as determined in step 2908, then the TL sets an indication that the received frame is a bad frame in step 2910. If the S_ID in the frame matches the value contained in the Remote_ID field of the IRE or IWE, then, in step 2912, the TL determines whether the received frame is part of an FCP_DATA sequence. If so, then in step 2914, the TL places the data contained within that FCP_DATA sequence frame into a host memory buffer indicated by the IRE or IWE corresponding to the FC exchange to which the FCP DATA sequence frame belongs. If the received FC frame is an FC_XFER_RDY sequence frame, as determined by the TL in step 2916, the TL, in step 2918, begins sending the FCP_DATA sequence that contains the data to be written to the target mass storage device. If the received FC frame is an FC_RSP sequence frame, as determined by the TL in step 2920, the TL, in step 2922, notifies the host by placing a completion message in the IMQ (902 in FIG. 9). The host completes any host processing required for the transaction upon receiving the completion message from the IMQ. Otherwise, in step 2924, the received FC frame is placed by the TL into the SFQ (903 in FIG. 9) and the TL places a message in the IMQ (902 in FIG. 9) to alert the host processor of the client computer of the receipt of an FC frame. Finally, in step 2926, the host processor of the client computer receives notification of the IMQ entry and begins processing the received FC frame. Thus, as discussed above with reference to FIGS. 25–26, the copying of the S_ID into the Remote_ID field of an IRE or IWE, in step 2906, provides the ability of the client computer to receive an FCP sequence directly from a mass storage device target. Otherwise, the check represented by step 2908 would cause FC frames directly received from a mass storage device target to be labeled as bad frames and placed into the SFQ, rather than being processed in steps 2914 and 2918. It should be emphasized that FIG. 29 illustrates processing of inbound FC sequences by a client operating within a client/server environment. Additional processing steps are required in the TL for processing outbound frames, and, in the case of receipt of an FCP_XFER_RDY frame from a mass storage device, as detected in step 2904, the TL undertakes additional operations to link the corresponding IWE into a linked list for subsequent processing.

Although the present invention has been described in terms of a particular embodiment, it is not intended that the invention be limited to this embodiment. Modifications within the spirit of the invention will be apparent to those skilled in the art. For example, the present invention may be used for implementing client/server protocols on communications networks other than the FC and for upper-level protocols on the FC other than SCSI. Different fields and bits within differently organized data structures may be employed to indicate to an interface controller that it needs to conduct the support steps of forwarding FCP_CMND sequences with a client S_ID and copying a received S_ID into a data structure that controls receipt of FC frames on a client computer. Details of data retrieval and sequencing of data messages may vary in different communications networks. Many different types of high-level specification languages may be used to specify the interface controller functionality required to support the client/server protocol of the present method. An almost limitless number of different state machines may be produces by these specifications in order to implement the TL hardware support of the present invention.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. An interface controller that operates along with a host processor and a host memory within a communications network node coupled to a communications network, the communications network node exchanging data packets with other external communications network nodes coupled to the communications network, the interface controller comprising:

a receiving and transmitting component for receiving data packets from the communications network and transmitting data packets to the communications network;

an interface component including control registers and shared data structures for receiving commands and data from the host processor and for providing data and information to the host processor; and a logic component that implements portions of a communications network protocol, including a forwarding operation that receives a data packet from a first external communications network node via the receiving and transmitting component, provides the received data packet to the host processor via the interface component, and receives a command from the host processor via the interface component to forward the received data packet to a second external computer network node via the receiving and transmitting component so that the data packet appears to have been sent to the second external computer network node directly from the first computer node, and an identification substitution component that, upon direction from the host processor, following transmission of a request data packet from the communications node to a first external communications node, receives, via the receiving and transmitting component, a first response data packet from a second external communications node, matches the received first response data packet to the transmitted request data packet, and processes the first response data packet as a response to the request data packet.

2. The interface controller of claim 1 wherein each data packet contains a source identifier that identifies the communications network node that sent the data packet and a destination identifier that identifies the communications network node to which the data packet has been sent.

3. The interface controller of claim 2 wherein, when the logic component transmits a request data packet via the receiving and transmitting component, the logic component stores an indication of the destination identifier within a request data structure that represents the request associated with the request data packet, and wherein the logic component matches the received first response data packet to the transmitted request data packet by matching the response data packet to the request data structure, substituting the source identifier contained in the first response data packet for the destination identifier stored in the request data structure.

4. The interface controller of claim 2 wherein the logic component forwards the received data packet to a second external computer network node via the receiving and transmitting component so that the data packet appears to have been sent to the second external computer network node directly from the first computer by including the source identifier from the received data packet as the source identifier in the forwarded data packet.

5. The interface controller of claim 1 wherein the communications network is a fibre channel communications network.

6. A method for conducting a data transfer operation requested of a server computer by a client computer for transfer of data between the client computer and a target mass storage device, the client computer, server computer, and mass storage device interconnected by a communications network that supports exchange of messages between the client computer, server computer, and mass storage device, the method comprising:

sending a request message from the client computer to the server computer requesting a data transfer operation;

receiving the request message by the server computer;

forwarding the request message by the server computer to the mass storage device;

when the request message specifies a read operation,
sending a number of data messages directly from the mass storage device to the client computer,
receiving the number of data messages by the client computer,
sending a status message directly from the mass storage device to the client computer, and
receiving the status message by the client computer;

when the request message specifies a write operation,
sending a number of data messages directly from the client computer to the mass storage device,
receiving the number of data messages by the mass storage device
sending a status message directly from the mass storage device to the client computer, and
receiving the status message by the client computer.

7. The method of claim 6 further including:

when the request message specifies a write operation,
sending a transfer ready message from the mass storage device to the client computer and receiving the transfer ready message by the client computer prior to sending a number of data messages directly from the client computer to the mass storage device.

8. The method of claim 7 wherein the messages include source and destination identifiers.

9. The method of claim 8 wherein forwarding the request message by the server computer to the mass storage device further includes:

authorizing by the server computer the data transfer operation requested is the request message;

determining by the server computer to which mass storage device to forward the request message; and including in the forwarded request message the source identifier of the client computer.

10. The method of claim 8 wherein sending the request message by the client computer further includes storing an indication that a response is expected to the request from the server computer and wherein receiving the transfer ready message by the client computer further includes matching the transfer ready message to the stored indication and changing the stored indication to indicate that any additional data and status messages received in response to the request message are expected from the mass storage device identified by the source identifier in the transfer ready message.

11. The method of claim 8 wherein sending the request message by the client computer further includes storing an indication that a response is expected to the request from the server computer and wherein, when the request message represents a read operation, receiving a first data message by the client computer further includes matching the first data message to the stored indication and changing the stored indication to indicate that any additional data and status messages received in response to the request message are expected from the mass storage device identified by the source identifier in the first data message.

* * * * *